United States Patent
Berthe De Pommery et al.

(10) Patent No.: US 10,559,832 B2
(45) Date of Patent: Feb. 11, 2020

(54) CELL FOR STORING POWER, COMPRISING AT LEAST ONE MALE ELEMENT AND ONE FEMALE ELEMENT EQUIPPED WITH ELECTRICAL CONNECTION INTERFACES

(71) Applicant: COMMISSARIAT A L'ENERGIE ATOMIQUE ET AUX ENERGIES ALTERNATIVES, Paris (FR)

(72) Inventors: Yves Berthe De Pommery, Grenoble (FR); Philippe Azais, Saint Egreve (FR); Lionel Picard, Seyssinet Pariset (FR); Guillaume Turin, Lille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 508 days.

(21) Appl. No.: 15/121,578

(22) PCT Filed: Feb. 24, 2015

(86) PCT No.: PCT/EP2015/053782
§ 371 (c)(1),
(2) Date: Aug. 25, 2016

(87) PCT Pub. No.: WO2015/128305
PCT Pub. Date: Sep. 3, 2015

(65) Prior Publication Data
US 2016/0359174 A1    Dec. 8, 2016

(30) Foreign Application Priority Data
Feb. 26, 2014    (FR) .................................. 14 51546

(51) Int. Cl.
*H01M 6/42*     (2006.01)
*H01M 2/02*     (2006.01)
(Continued)

(52) U.S. Cl.
CPC ........... *H01M 6/42* (2013.01); *H01M 2/0245* (2013.01); *H01M 2/0277* (2013.01);
(Continued)

(58) Field of Classification Search
None
See application file for complete search history.

(56) References Cited

U.S. PATENT DOCUMENTS

| 7,252,903 B2 | 8/2007 | Kawabata et al. |
| 2003/0054240 A1* | 3/2003 | Aronsson ............ H01M 2/1077 429/157 |

(Continued)

FOREIGN PATENT DOCUMENTS

| DE | 10 2005 042 169 A1 | 3/2007 |
| EP | 2 565 961 A1 | 3/2013 |

(Continued)

OTHER PUBLICATIONS

U.S. Appl. No. 14/785,207, filed Oct. 16, 2015, 2016/0071658 A1, Phillippe Azais et al.

(Continued)

*Primary Examiner* — Wyatt P McConnell
(74) *Attorney, Agent, or Firm* — Oblon, McClelland, Maier & Neustadt, L.L.P.

(57) ABSTRACT

The invention primarily relates to a cell (1) for storing power, which is to be integrated in an electrical module for assembling a power storage system, having a first surface (1*a*; 1*c*) and a second surface (1*b*; 1*d*), characterised in that the cell (1) comprises at least one male element (5; 5*a*, 5*b*, 5*c*) on one of the first (1*a*; 1*c*) and second (1*b*; 1*d*) surfaces thereof, and at least one female element (6; 6*a*, 6*b*, 6*c*) on the other of the first (1*a*; 1*c*) and second (1*b*; 1*d*) surfaces thereof, which elements are shaped such as to be fitted into one another such that the cell (1) is configured such as to be (Continued)

assembled to another cell (1) of the same type, in that at least one male element (5; 5a, 5b, 5c) comprises at least one electrical connection interface having positive polarity (8; 8a, 8b, 8c) and in that at least one female element (6; 6a, 6b, 6c) comprises at least one electrical connection interface having negative polarity (9; 9a, 9b), or conversely such that the cell (1) is configured such as to be electrically connected to another cell (1) of the same type.

30 Claims, 17 Drawing Sheets

(51) Int. Cl.
```
H01M 2/10      (2006.01)
H01M 2/26      (2006.01)
H01M 2/30      (2006.01)
H01M 10/04     (2006.01)
H01M 2/20      (2006.01)
```
(52) U.S. Cl.
CPC ......... *H01M 2/1077* (2013.01); *H01M 2/202* (2013.01); *H01M 2/263* (2013.01); *H01M 2/30* (2013.01); *H01M 10/0431* (2013.01); *H01M 2220/20* (2013.01)

(56) References Cited

U.S. PATENT DOCUMENTS

| | | | |
|---|---|---|---|
| 2010/0178547 A1* | 7/2010 | Li | H01M 2/0245 429/151 |
| 2012/0058382 A1 | 3/2012 | Carignan et al. | |
| 2012/0148907 A1 | 6/2012 | Chang et al. | |
| 2013/0029201 A1 | 1/2013 | Moto Hashi et al. | |
| 2013/0059477 A1 | 3/2013 | Lavender | |
| 2013/0071725 A1 | 3/2013 | Hougron | |
| 2014/0370373 A1 | 12/2014 | Hougron | |
| 2015/0270514 A1* | 9/2015 | Baek | H01M 2/1061 429/151 |

FOREIGN PATENT DOCUMENTS

| | | |
|---|---|---|
| JP | 48-10538 | 2/1973 |
| JP | 7-142039 A | 6/1995 |
| JP | 10-64492 A | 3/1998 |
| JP | 2010-80411 | 4/2010 |
| JP | 2010-232102 A | 10/2010 |
| JP | 2011-119122 A | 6/2011 |
| WO | WO 2007/028803 A1 | 3/2007 |
| WO | WO 2010/109882 A1 | 9/2010 |

OTHER PUBLICATIONS

U.S. Appl. No. 15/108,966, filed Jun. 29, 2016, Matthieu Picot et al.
U.S. Appl. No. 13/818,191, filed Feb. 21, 2013, 2013/0157111 A1, Marianne Chami et al.
U.S. Appl. No. 14/397,101, filed Oct. 24, 2014, 2015/0125762 A1, Charles Gayot et al.
U.S. Appl. No. 15/023,422, filed Mar. 21, 2016, 2016/0211549 A1, Charles Gayot et al.
Japanese Office Action dated Mar. 26, 2019 in Patent Application No. 2016-553526 (submitting English translation only) citing documents AA and AO therein, 4 pages.
International Search Report dated Jun. 9, 2015, in PCT/EP2015/053782 filed Feb. 24, 2015.
French Search Report dated Dec. 12, 2014, in French Application No. 1451546 filed Feb. 26, 2014.

* cited by examiner

CELL FOR STORING POWER, COMPRISING AT LEAST ONE MALE ELEMENT AND ONE FEMALE ELEMENT EQUIPPED WITH ELECTRICAL CONNECTION INTERFACES

TECHNICAL FIELD

This invention relates to the field of cells for storing power, and in particular to the field of elementary electrochemical cells. Such cells are intended to be assembled in modules which are themselves assembled together to form a power storage system, for example a battery pack. More particularly, the invention relates to the field of assembly and electrical connection systems integrated into such cells for storing power.

The invention applies preferentially to elementary electrochemical cells that form electrochemical generators. However, it can also relate to capacitors and electrochemical or dielectric supercapacitors, for example.

It has applications in many fields of industry, in particular for stationary or on-board applications, in particular for the field of electrical power of transport, land, air and/or sea vehicles, for example for the electrical power of hybrid and/or electrical vehicles for which an arrangement of a large number of cells for storing power is required.

Among the elementary electrochemical cells, three main types of geometry of architecture are commonly used. As such, conventionally and known per se, the cells can have a cylindrical geometry, a prismatic geometry or a geometry in pouch/stack (also referred to as "pouch-cell").

Preferentially, the invention can be applied to elementary electrochemical cells of prismatic geometry although it can also relate to other types of geometry of electrochemical cells.

It as such proposes a cell for storing power comprising male and female elements for the assembly and the electrical connection of the cell, an electrical module for assembling comprising a plurality of such cells, a power storage system comprising a plurality of such modules for assembling, as well as a method for manufacturing such a cell for storing power.

PRIOR ART

Storage batteries are systems that make it possible to store electrical energy in chemical form. They are based on a reversible electrochemical system, i.e. rechargeable. However, all of the propositions mentioned hereinafter remain valid for primary systems (non-rechargeable), unless mentioned otherwise.

The electrochemical power storage system is an assembly of electrochemical modules, which themselves are assemblies of elementary electrochemical cells that constitute storage batteries. In the power storage system, the electrochemical cells are connected and managed by an electronic control unit, also referred to as an electronic BMS for "Battery Management System", which makes it possible to optimise the charging and discharging and to extend the service life.

Storage batteries or cells contain chemical reagents that, once activated, make it possible to provide electricity on demand. These electrochemical reactions are activated in the elementary electrochemical cell, between a positive electrode and a negative electrode submerged in an electrolyte, when an electrical charge is connected to the terminals of the cell. By way of example, the Li-ion technology consists in using the electrochemical circulation of the lithium ion in two materials and at different values of potential: the positive electrode and the negative electrode constitute the two redox potentials, and the difference in potential creates the voltage in the battery. During use (the storage battery is discharging), the negative electrode releases the lithium in ionic form $Li^+$. The $Li^+$ ions then migrate to the positive electrode, via the ionic conductor electrolyte. The passage of each $Li^+$ ion in the storage battery is compensated by the passage of an electron in the external circuit (current flowing from the terminals of the storage battery), in the reverse direction, as such creating the electric current makes possible to operate the device associated with the battery. There is therefore electric current until there is no more lithium in the negative electrode: the storage battery is then discharged and the recharging thereof is done according to the reverse process.

In order to be able to assemble and connect the cells together, whether concerning elementary electrochemical cells as presented hereinabove or cells for storing power more generally, electrical connection systems are planned on the latter.

Currently, the electrical connection systems used are conventionally carried out by an external conductive part, typically an added connection lug connected the cells together, and two apparent positive and negative electrical terminals, located either on the same surface (case with motor vehicle batteries for example), or on opposite surfaces.

These types of electrical connection systems are however not very satisfactory due to their dangerousness, in particular in the field of power elements, both for the operators and for the storage cell itself. Indeed, the external conductive part and the apparent terminals increase the risks of a short circuit.

Solutions have been proposed in prior art to attempt to limit these disadvantages. As such, U.S. Patent application 2012/0058382 A1 proposes a system of added connections in order to prevent electric shock, before mounting and after mounting, and in order to make it possible to disconnect the cells in case of an accident. U.S. Patent application 2013/0029201 A1 describes a putting into a module of fine cells with a single external connector for each pole of the cells. This connector, by reducing the total number of parts, has for purpose to limit the risks of a short circuit.

Moreover, solutions have been described in order to carry out the conditioning of the storage cells by application of a packaging, for example by screwing, gluing, overmoulding and/or deformation. Patent application JP 2011-119122 A uses for example overmoulding in order to inject a final packaging around the cell and its terminals. U.S. Pat. No. 7,252,903 B2 also describes the use of overmoulding for assembling several portions of the cell together, of which safety elements, while still giving the final shape to the upper portion of the cell. Finally, U.S. Patent application 2012/0148907 A1 proposes to overmould the cover of the cell on the terminals in order to reduce the risk of leaks.

However, in most of these solutions of prior art, there are cells for storing power carried out with a conductive packaging, typically made of aluminium, in contact with one of the terminals of the cell, and always apparent cell connectors from the same side or one side and the other of the cell. However, as indicated hereinabove, this type of cell causes high risks for the health of the operator and the proper operation of the cell, in particular in the case of a high-energy cell. The risks for the operator are of an electrical nature and caused by the possibility of being able to touch the two terminals or conductive parts in contact with the terminals. In addition, the risks for the cell are to obtain a short-circuiting of the two terminals which can result in the degradation or a substantial heating of the cell.

DESCRIPTION OF THE INVENTION

The invention as such has for purpose to remedy at least partially the needs mentioned hereinabove and the disadvantages relative to the embodiments of prior art.

The invention aims in particular to propose a new type of cell for storing power comprising a safety connection system that cannot be short circuited.

The invention has as such for object, according to one of its aspects, a cell for storing power, intended to be integrated into an electrical module for assembling a power storage system, having a first surface and a second surface, opposite the first surface,
characterised in that the cell comprises, on one of its first and second surfaces, at least one male element, and on the other of its first and second surfaces, at least one female element, said at least one male element and at least one female element having forms allowing for their fitting into one another in such a way that the cell is configured to be assembled to another cell of the same type, said at least one male element or said at least one female element of the cell being respectively fitted with at least one female element or at least one male element of the other cell of the same type, and in that at least one male element of said at least one male element and at least one female element comprises at least one electrical connection interface having positive polarity and that at least one female element of said at least one male element and at least one female element comprises at least one electrical connection interface having negative polarity, or inversely, in such a way that the cell is configured to be electrically connected to another cell of the same type.

Thanks to the invention, it is possible to carry out a simple and safe assembly of several cells for storing power in accordance with the invention in an electrical module for assembling a power storage system, by the intermediary of the male and female elements that nest into one another. The connection interfaces being located on the male and female elements, they can be difficult to access, even inaccessible, by the outside environment, and in particular by an operator, which can advantageously make it possible to suppress the risks, in particular of a court-circuit.

The cell for storing power according to the invention can furthermore comprise one or several of the following characteristics taken individually or in any technically permissible combination.

The first and second surfaces opposite the cell can be constituted by the upper and lower surfaces of the cell, and even by two lateral surfaces opposite the cell.

Said at least one male element and a female element of the cell have advantageously complementary forms, making possible as such their fitting into one another for the assembly of the cell with another cell of the same type.

Said at least one electrical connection interface having positive polarity and an electrical connection interface having negative polarity are preferentially formed on portions of said at least one male element and a female element allowing them to be masked during the assembly of the cell with another cell of the same type.

The cell is preferentially of prismatic geometry.

The cell can preferentially be an elementary electrochemical cell, comprising a negative electrode, a positive electrode, and an electrolyte located between the negative electrode and the positive electrode.

Said at least one electrical connection interface having positive polarity and said at least one electrical connection interface having negative polarity can be respectively formed on a portion with reduced or zero accessibility of said at least one male element and on a portion with reduced or zero accessibility of said at least one female element, or inversely, in particular the portion with reduced or zero accessibility of said at least one male element corresponding to a portion intended to be covered by at least one female element of another cell of the same type during the assembly by fitting of the cell with the other cell of the same type, and the portion with reduced or zero accessibility of said at least one female element corresponding to a portion intended to be covered by at least one male element of another cell of the same type during the assembly by fitting of the cell with the other cell of the same type.

The electrical connection interfaces, respectively of said at least one male element and of said at least one female element, can be formed on lateral portions, in particular internal, respectively of said at least one male element and a female element.

Said at least one male element can extend from one edge to the other of said one of first and second surfaces of the cell. Said at least one female element can extend from one edge to the other of said other of the first and second surfaces of the cell.

Said at least one male element can have a shape of a groove in relief. Said at least one female element can have a shape of a hollow groove. The forms of grooves in relief and with hollows are advantageously complementary with one another in order to allow for the assembly of the cell with another cell of the same type.

Said one of the first and second surfaces of the cell can comprise at least one lug, in particular two lugs on either side of said at least one male element, in order to allow for the assembly and the safety connection of said at least one male element with at least one female element of another cell of the same type.

Said at least one male element and said at least one female element can have similar shapes, with the assembly of the cell with another cell of the same type being made possible by an opposite orientation of said at least one male element and of said at least one female element of the cell respectively with respect to at least one female element and at least one male element of the other cell of the same type, during the fitting.

Note that, in this description, the term "similar" must be understood as meaning "complementary".

Said at least one electrical connection interface having positive polarity can extend partially over said at least one male element, in particular in the vicinity of an edge of said one of first and second surfaces of the cell. Said at least one electrical connection interface having negative polarity can extend partially over said at least one female element, in particular in the vicinity of an edge of said other of the first and second surfaces of the cell, or inversely.

Said at least one male element can extend longitudinally, i.e. along the largest dimension, on said one of first and second surfaces of the cell. Said at least one female element can extend longitudinally, i.e. along the largest dimension, over said other of the first and second surfaces of the cell.

Said at least one male element can extend transversally, i.e. along the smallest dimension, on said one of first and second surfaces of the cell. Said at least one female element can extend transversally, i.e. along the smallest dimension, over said other of the first and second surfaces of the cell.

The cell can comprise an electrical core, in particular an electrochemical core comprising a negative electrode, a positive electrode and an electrolyte located between the negative electrode and the positive electrode, covered by a packaging configured in such a way as to not cover said at least one electrical connection interface having positive polarity and an electrical connection interface having negative polarity.

Said at least one male element and/or said at least one female element can be, at least partially, formed by the packaging.

The lug or lugs of said one of the first and second surfaces of the cell can also be formed by the packaging.

The electrical core can comprise a negative electrode and a positive electrode. At least one of the negative electrode and of the positive electrode can comprise at least one male electrode element and/or at least one female electrode element of a shape respectively similar to that of said at least one male element of the cell and/or of said at least one female element of the cell. The packaging can cover said at least one male electrode element and/or said at least one female electrode element, by having a form that hugs that of said at least one male electrode element and/or that of said at least one female electrode element, in such a way as to respectively form said at least one male element of the cell and/or said at least one female element of the cell.

Said at least one male element and/or said at least one female element can extend respectively from an edge of said one of the first and second surfaces of the cell and of said other of the first and second surfaces of the cell.

Said one of the first and second surfaces of the cell can comprise at least one male element and at least one female element. Said other of the first and second surfaces of the cell can also comprise at least one male element and at least one female element.

The cell can comprise means for maintaining the cell in position with another cell of the same type.

The means for maintaining in position can comprise orifices formed in said at least one male element and at least one female element, and in the possible lug or lugs of said at least one male element, the orifices of said at least one male element and the orifices of said at least one female element of the cell being respectively configured to be orifices of at least one female element and orifices of at least one male element of another cell of the same type, during the assembly of the cell with at least one other cell of the same type. The means for maintaining in position can further comprise at least one rod for maintaining in position able to be inserted into the orifices of said at least one male element and at least one female element of the cell.

The means for maintaining in position can comprise at least one groove for maintaining in position formed on the cell, in particular the packaging of the cell, configured in such a way as to be superposed upon at least one groove for maintaining in position of another cell of the same type, during the assembly of the cell with at least one other cell of the same type. The means for maintaining in position can comprise furthermore a part for maintaining in position configured to be inserted into said at least one groove for maintaining in position of the cell and of the cell of the same type during the assembly of the cells.

The cell can comprise, on said one of its first and second surfaces, at least two male elements extending substantially parallel from one edge to the other of said one of first and second surfaces of the cell, and on said other of its first and second surfaces, at least two female elements extending substantially parallel from one edge to the other of said other of the first and second surfaces of the cell.

Said at least two male elements can be respectively superposed upon said at least two female elements.

The cell can comprise an electrochemical core comprising a negative electrode, a positive electrode and an electrolyte located between the negative electrode and the positive electrode. One of the positive electrode and of the negative electrode can comprise a male electrode element extending to said one of first and second surfaces of the cell and a female electrode element extending to said other of the first and second surfaces of the cell, the male electrode element and the female electrode element being superposed each upon the other. The other of the positive electrode and of the negative electrode can comprise a male electrode element extending to said one of first and second surfaces of the cell and two female electrode elements extending to said other of the first and second surfaces of the cell or two male electrode elements extending to said one of first and second surfaces of the cell and a female electrode element extending to said other of the first and second surfaces of the cell, a male electrode element and a female electrode element being superposed each upon the other.

The electrochemical core can be covered by a packaging configured in such a way as to not cover the electrical connection interfaces having positive polarity and the electrical connection interfaces having negative polarity of the male and female elements of the cell, with the packaging defining said male and female elements (6a, 6b) of the cell and hugging the shapes of the male electrode elements and of the female electrode elements.

The cell can have, on one of its first and second surfaces, an electrical connection interface having negative polarity and an electrical connection interface having positive polarity and, on the other of its first and second surfaces, an electrical connection interface having positive polarity and two electrical connection interfaces having negative polarity, or an electrical connection interface having negative polarity and two electrical connection interfaces having positive polarity.

The invention further has for object, according to another of its aspects, a unit comprising a first cell and a second cell such as defined hereinabove, said at least one male element of the first cell being fitted into said at least one female element of the second cell, or said at least one female element of the first cell being fitted into said at least one male element of the second cell, in order to allow for the assembly and the electrical connection of the first and second cells together.

Moreover, the invention further has for object, according to another of its aspects, an electrical module for assembling a power storage system, characterised in that it comprises an assembly of several cells such as defined hereinabove.

The module can be an electrochemical module for assembling comprising an assembly of several elementary electrochemical cells.

The module can comprise at least one male module element and at least one female module element, respectively of the same type as said at least one male element and at least one female element of the cells, in order to allow for the assembly and the electrical connection of the cells on the module for assembling.

The module can comprise at least one male connecting rod able to be fitted into a plurality of female elements of the cells, and at least one female connecting rod able to be fitted into a plurality of male elements of the cells, in such a way as to allow for the assembly and the electrical connections of the cells together in the module for assembly.

The invention also has for object, according to another of its aspects, a power storage system, characterised in that it comprises an assembly of several modules such as defined hereinabove.

The power storage system can comprise at least one male battery element (or power storage system) and at least one female battery element (or power storage system), respectively of the same type as said at least one male element and at least one female element of the cells, in order to allow for the assembly and the electrical connection of the cells on the power storage system.

The invention further has for object, according to another of its aspects, a method for manufacturing a cell for storing power such as defined hereinabove, characterised in that it comprises one or several of the following steps:

a) positioning an electrical core, in particular an electrochemical core, in a mould, with the electrical core being in particular constituted by a spool or a stack, b) overmoulding around the electrical core an insulating material, in particular a film made of an insulating material, more preferably sealed and chemically stable with respect to the electrolyte of the electrochemical core, c) carrying out at least one positive or negative electrode on at least one edge of the electrical core, in particular a bank of the electrical core, said at least one positive or negative electrode comprising at least one positive or negative male or female electrode element, d) filling the electrical core with an electrolyte, e) possibly, in case of carrying out a single positive or negative electrode in the step c), carrying out the other positive or negative electrode on the other edge of the electrical core, in particular on the other bank of the electrical core, said other positive or negative electrode comprising at least one positive or negative male or female electrode element, f) overmoulding a packaging on the electrical core and the two positive and negative electrodes, in such a way as to define said at least one male element and a female element of the cell, the packaging only partially covering said at least one male electrode element and a female electrode element in such a way as to form said at least one electrical connection interface having negative polarity and at least one electrical connection interface having positive polarity.

The method of manufacturing according to the invention can advantageously make it possible to carry out the cell with the least amount of elements and the least amount of operations possible. To do this, the method uses preferentially steps of injecting, overmoulding and/or of powder metallurgy, using an electrical core, in particular electrochemical, for example a stack or a spool carried out beforehand.

The spool is an electrochemical core carried out by winding a positive double electrode, a separator and a negative double electrode superposed.

The stack is an electrochemical core carried out via stacking of a positive double electrode, of a separator and of a negative double electrode.

The insulating material can in particular be chosen from polyethylene (PE), polypropylene (PP), polyetheretherketone (PEEK), polyetherarylketone (PEAK), polyethylene terephthalate (PET), polytetrafluoroethylene (PTFE), among others.

The method can have a first alternative for implementation and comprise all of the steps a) to f) in a successive order.

In the step b), the insulating material is advantageously overmoulded around the electrical core in such a way as to not cover the edges, in particular the banks, of the electrical core.

The step c) can be a step of using a method of powder metallurgy (also designated by PIM method (Powder Injection Moulding)) in order to inject a positive or negative electrode into a conductive material around the edge of the electrical core, in particular around the bank of the electrical core.

The step d) of filling with electrolyte can be done according to several methods. With a vacuum injection into the mould, a depression method can be used. With a neutral atmosphere, for example comprising argon, electrolyte under pressure can be injected.

The possible step e) can also be a step of using a method of powder metallurgy in order to inject the other positive or negative electrode into a conductive material around the edge of the electrical core, in particular around the bank of the electrical core.

In the first alternative for implementation of the method according to the invention, all of the steps carried out after the step d) of filling with electrolyte are preferentially carried out at low temperature in order to prevent any degradation of the electrolyte. In addition, the negative electrode is preferentially carried out before the positive electrode, because as it is constituted of metal at a higher temperature, it requires a higher sintering temperature.

The method can have a second alternative for implementation and comprise the steps c), e), a), b), d) and f) in a successive order, the steps c) and e) being steps of using a powder metallurgy method.

In this second alternative, a formation step can also be provided of at least one orifice on one of the positive and negative electrodes in order to allow for the filling with electrolyte.

The method can further have a third alternative for implementation and comprise the steps c), e), a), b), d) and f) in a successive order, the steps c) and e) being steps of fastening of one or of both positive and negative electrodes on one or both edges of the electrical core, in particular the banks of the electrical core, with these electrodes being formed by means of metal tabs.

The characteristics mentioned in this description can be taken individually or according to any technically permissible combinations with other characteristics.

BRIEF DESCRIPTION OF THE DRAWINGS

The invention can be better understood when reading the following detailed description of examples of non-limiting embodiments of the latter, as well as examining the figures, diagrammatic and partial, of the annexed drawing, wherein.

In all of these figures, identical references can designate identical or similar elements.

Figure 1:
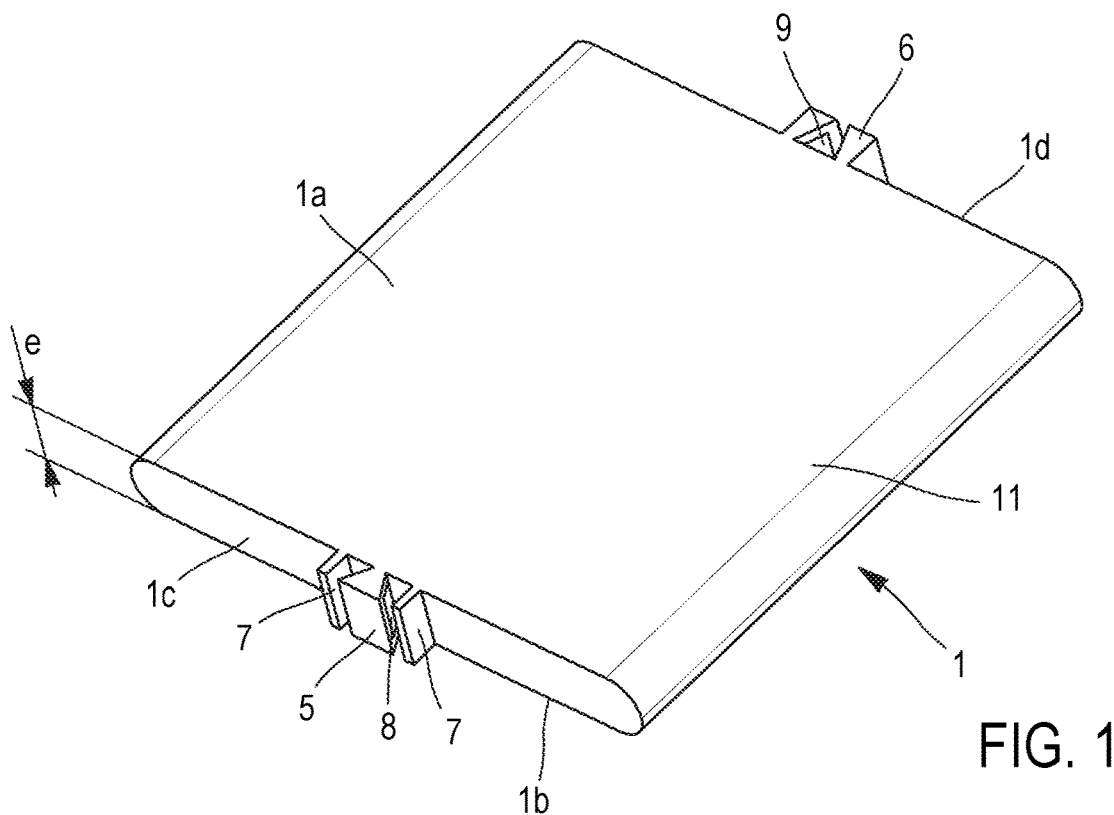
FIG. 1 shows, in perspective, a first example of a cell for storing power in accordance with the invention.

In addition, the various portions shown in the figures are not necessarily shown to a uniform scale, in order to make the figures more legible.

DETAILED DESCRIPTION OF PARTICULAR EMBODIMENTS

In all of the examples described hereinafter, the cells for storing power 1 are elementary electrochemical cells 1, intended to form electrochemical generators. However, as has been indicated hereinabove, the cells for storing power can be of another type, allowing for example for the formation of electrochemical or dielectric supercapacitors and/or capacitors.

In addition, each elementary electrochemical cell 1 comprises an electrochemical core 10, comprising a negative electrode 2, a positive electrode 3 and an electrolyte 4 between the negative 2 and positive 3 electrodes, in such a way as to allow for the carrying out of an electrochemical reaction.

Finally, the elementary electrochemical cells 1 shown here are of prismatic geometry, comprising an upper main surface 1a, opposite a lower main surface 1b, and two lateral surfaces 1c and 1d, opposite one another. Of course, the invention is not limited to a prismatic geometry of the cell 1, which can as such have any type of geometry of architecture.

FIG. 1 shows, in perspective, diagrammatically and partially, a first embodiment of a cell for storing power 1 in accordance with the invention, of the elementary electrochemical cell 1 type.

The cell 1 is in particular intended to be integrated into an electrochemical module for assembly of a power storage system.

The cell 1 has as such a first surface 1c, corresponding to a first lateral surface of the cell 1, and a second surface 1d, corresponding to the lateral surface opposite the first surface 1c.

In accordance with the invention, the first surface 1c comprises a male element 5 and the second surface 1d comprises a female element 6, with the complimentary shapes of the male 5 and female 6 elements allowing them to fit into one another.

In other words, the male element 5 of the cell 1 can allow for the assembly of the cell 1 with another cell 1 of the same type, by fitting of this male element 5 on the female element 6 of the other cell 1 of the same type. Likewise, the female element 6 of the cell 1 can allow for the assembly of the cell 1 with another cell 1 of the same type, by fitting of this female element 6 on the male element 5 of the other cell 1 of the same type.

As can be seen in FIG. 1, the male element 5 extends from one edge to the other of the first surface 1c, and the female element 6 also extends from one edge to the other of the first surface 1d.

Furthermore, the male element 5 of the cell 1 has an electrical connection interface 8 having positive or negative polarity, and the female element 6 of the cell 1 also has an electrical connection interface 9 having negative or positive polarity, with the polarities of the two electrical connection interfaces 8 and 9 being opposite since one is connected to the positive electrode 3 (cathode) and the is connected to the negative electrode 2 (anode) of the electrochemical core 10.

In this way, it is possible to carry out the electrical connection of the cell 1 with another cell 1 of the same type when they are assembled between them through the bias of the male 5 and female 6 elements. This electrical connection can be carried out in series or in parallel according to the direction of assembly of the cells 1 between them and of the polarities of the male 5 and female 6 elements.

Note that, in this description, the male 5 and female 6 elements constituent preferentially male 5 and female 6 grooves.

The electrochemical core 10, with more details provided in what follows, of the cell 1 of FIG. 1 is moreover covered by a packaging 11.

This packaging 11 makes it possible to protect the electrochemical core 10. It covers in particular all of the latter except for electrical connection interfaces 8 and 9 of the male 5 and female 6 elements, in order to ensure the electrical connection of the cells 1 together. In particular, on these electrical connection interfaces 8 and 9, appear directly the positive electrode 3 in order to form an electrical connection interface having positive polarity or the negative electrode 2 in order to form an electrical connection interface having negative polarity.

Advantageously, as can be seen in FIG. 1, the electrical connection interfaces 8 and 9 are respectively formed in zones of reduced or zero accessibility of the male 5 and female 6 elements. In other words, the forms of the male 5 and female 6 elements make it possible to have electrical connection interfaces 8 and 9 that are hardly or that are not accessible in order to reduce the risks, in particular of a short circuit.

Figure 1A:
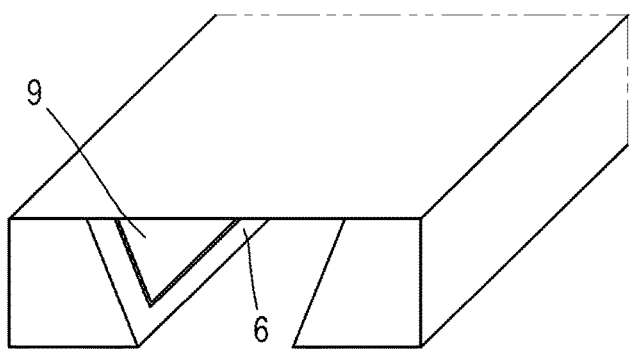
FIGS. 1A and 1B show respectively, in perspective, details for carrying out female and male elements of a cell for storing power in accordance with the invention.
Figure 1B:
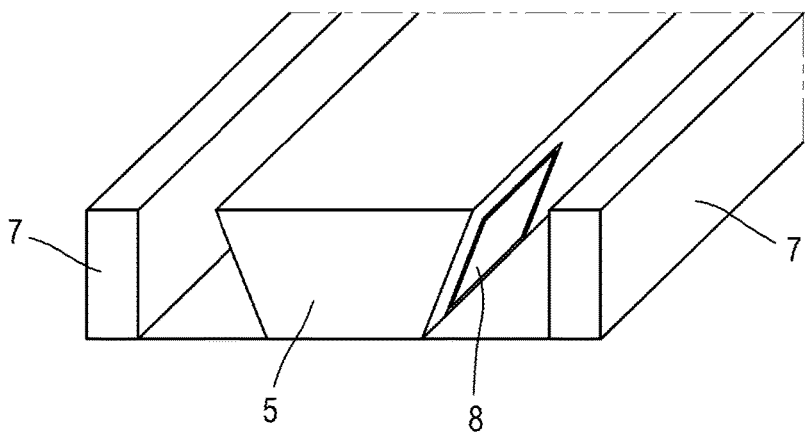

FIGS. 1A and 1B show respectively, in perspective, details for carrying out female 6 and male 5 elements of the cell 1.

The electrical connection interfaces 8 and 9 may or may not extend over the entire length of the male 5 and female 6 elements, in particular from one edge to the other of the first 1c and second 1d surfaces of the cell 1. They can also be formed at one end of the male 5 and female 6 elements.

FIG. 1, and FIG. 1B, show also the possibility of having lugs 7 on either side of the male element 5. The presence of the lugs 7, extending in particular substantially parallel between them and to the male element 5, and in particular from one edge to the other of the first surface 1c, makes it possible to obtain two grooves that fit on either side of the female element 6 of another cell 1 of the same type during the assembly of the cell 1, and advantageously make it possible to reduce the accessibility to the electrical connection interfaces 8 in order to prevent any possibility of putting the various electrical terminals into accidental contact.

Moreover, FIG. 1 shows the possibility for the cell 1 to have a single male 5 or female 6 element at each end of the cell 1, i.e. on the first lateral surface 1c and on the first lateral surface 1d, on the side of the banks 12 of the electrochemical core 10, as shall be described in what follows. In this FIG. 1, the male 5 and female 6 elements are located in the direction of the thickness e of the cell 1.

Figure 2:
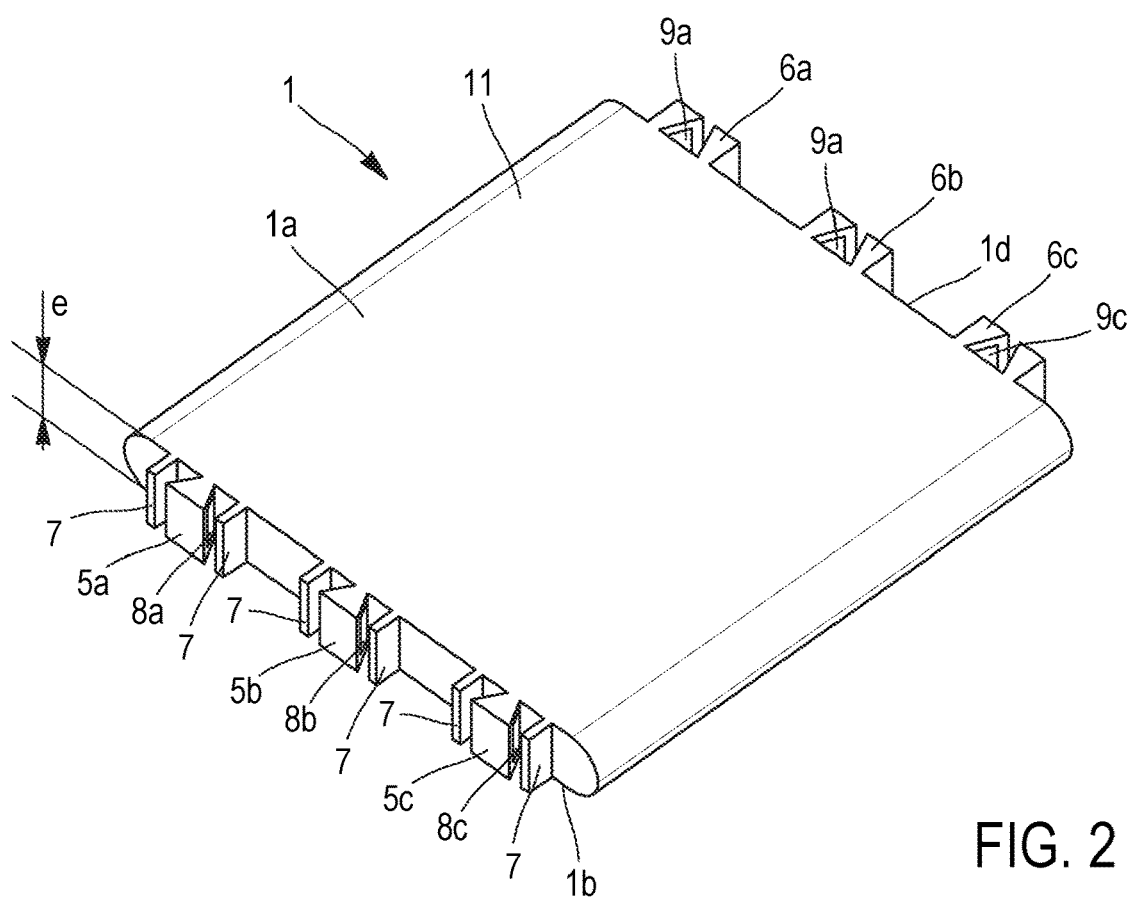
FIGS. 2 and 3 show respectively, in perspective, second and third embodiments of a cell for storing power in accordance with the invention.

FIG. 2 shows, in perspective, a second embodiment of an elementary electrochemical cell 1 in accordance with the invention, wherein the male 5a, 5b, 5c and female 6a, 6b, 6c elements are formed in the direction of the thickness e of the cell 1.

In particular, the first surface 1c comprises three male elements 5a, 5b and 5c, comprising respectively electrical connection interfaces 8a, 8b and 8c, and the second surface 1d comprises three female elements 6a, 6b and 6c, comprising respectively electrical connection interfaces 9a, 9b and 9c.

In this configuration of FIG. 2, the increase in the number of male 5a, 5b, 5c and female 6a, 6b, 6c elements can allow for an increase of the connection surface of the cell 1.

Figure 3:
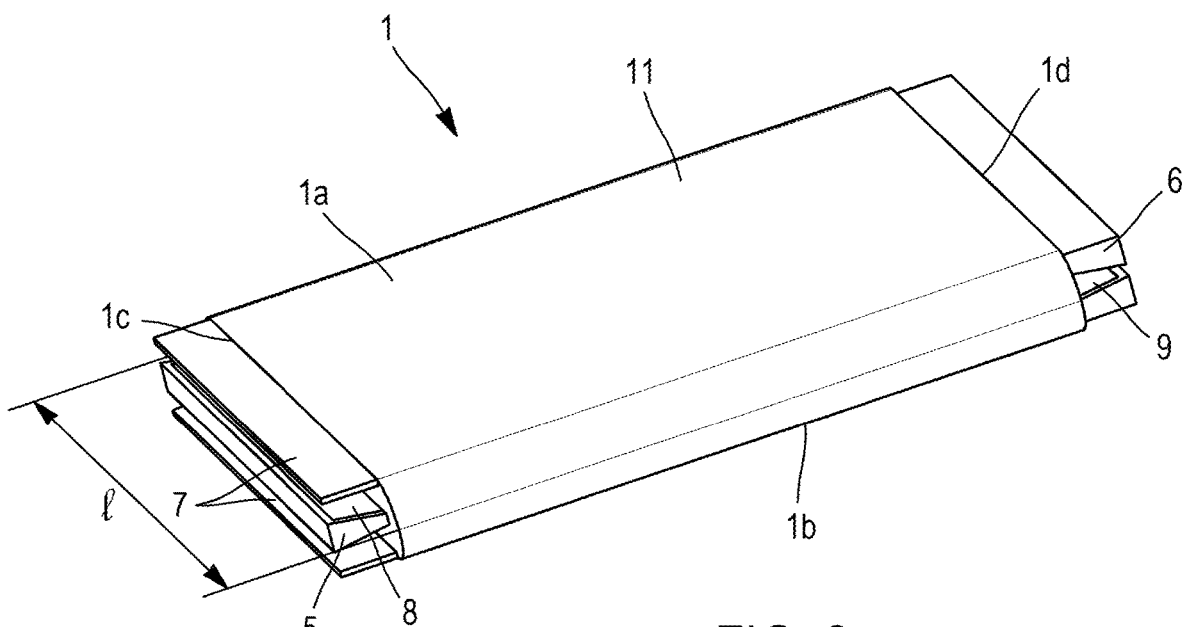

FIG. 3 shows moreover, in perspective, the possibility for the elementary electrochemical cell 1 to comprise male 5 and female 6 elements formed in the direction of the width I of the cell 1.

The first, second and third embodiments of the cell 1 shown respectively in FIGS. 1, 2 and 3, allow preferentially for a mounting in series of two cells 1 of the same type.

However, the mounting in parallel can be obtained by the intermediary of the electrochemical module for assembly or of the power storage system comprising male and female elements of the same type as those of the cells 1. The mounting in parallel can also be carried out by the intermediary of connecting rods 13a and 13b, as described in reference to FIGS. 4A and 4B.

Figure 4A:
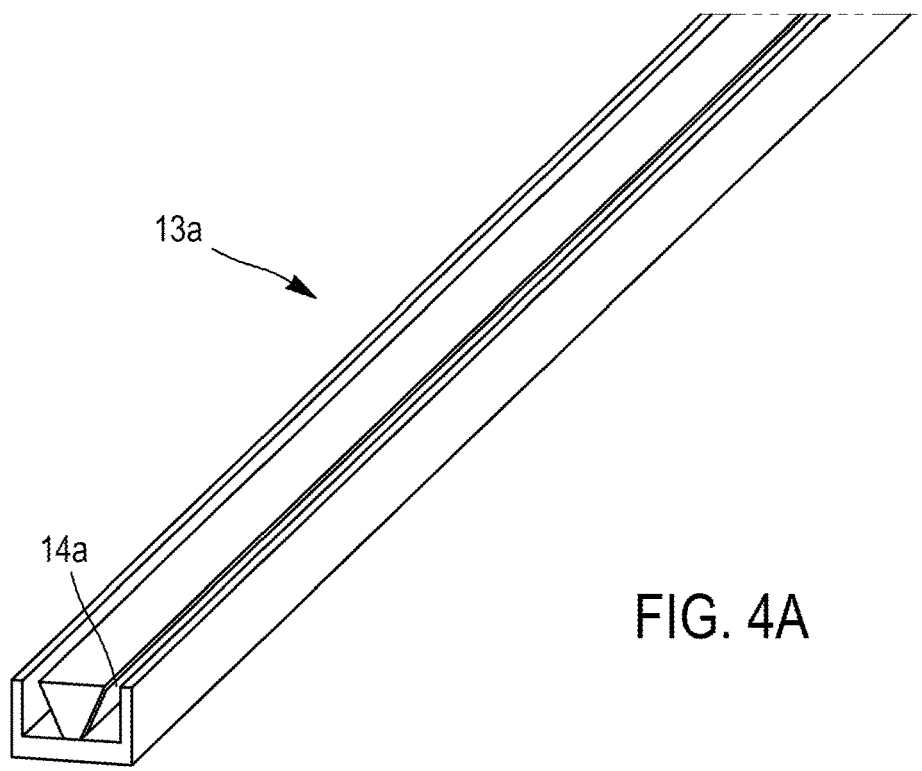
FIGS. 4A and 4B show respectively, in perspective, examples of male and female connecting rods for the assembly and the electrical connecting of a plurality of female elements and of a plurality of male elements of cells for storing power in accordance with the invention.
Figure 4B:
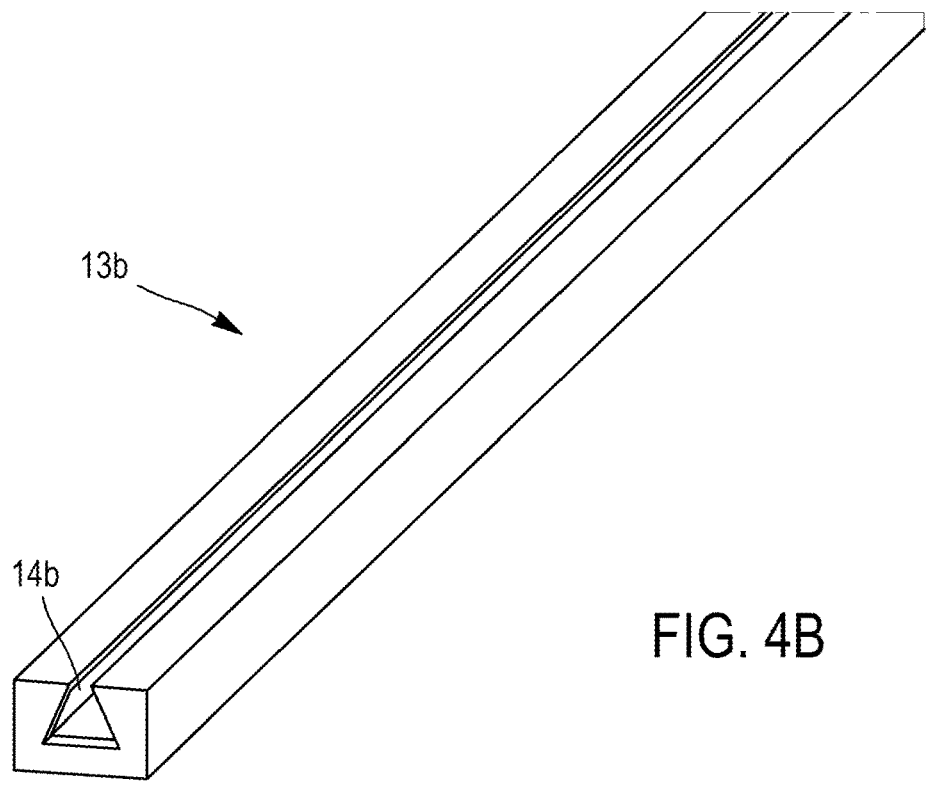

The FIGS. 4A and 4B show indeed respectively, in perspective, a male connecting rod 13a intended to be fitted into a plurality of female elements 6 of the cells 1, and a female connecting rod 13b, intended to be fitted into a plurality of male elements 5 of the cells 1.

The male connecting rod 13a comprises an electrical connection interface 14a and the female connecting rod 13b comprises an electrical connection interface 14b.

The male connecting rod 13a has a form of fitting similar to that of the male elements 5 of the cells 1, and the female connecting rod 13b has a form of fitting similar to that of the female elements 6 of the cells 1.

Likewise, the male 13a and female 13b connecting rods comprise respectively the electrical connection interfaces 14a and 14b in zones that limit their accessibility, in other words in masked zones of the connecting rods 13a and 13b, in such a way as to limit the risks, in particular of a short circuit.

The use of such male 13a and female 13b connecting rods can in particular be favoured for elementary electrochemical cells 1 of small size and/or for high-intensity applications.

The maintaining in position of the cells 1 of this type, with presence of connecting rods 13a, 13b, between them or with the electrochemical module for assembly or the power storage system, can be done by the intermediary in particular of one or several rods for maintaining in position, as shall be described in what follows.

In the examples described hereinabove in reference to FIGS. 1 to 4B, and also in the following examples, the male elements 5 have the form of dovetails able to be fitted in corresponding housings of the female elements 6. However, this choice is in no way limiting.

As such, as incomplete examples of possible combinations between a male element 5 and a female element 6 for fitting, FIGS. 5A-5B, 6A-6B, 7A-7B, 8A-8B and 9A-9B show possibilities of possible shapes for the male 5 and female 6 elements of the cell 1.

The male 5 and female 6 elements can be of various shapes, but it is preferable to allow for an assembly and disassembly of the cells 1 while suppressing the highest number of degrees of freedom.

Figure 5A:
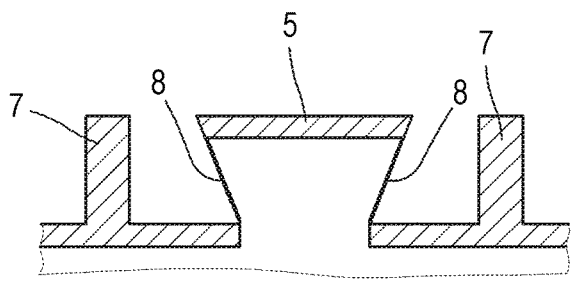
FIGS. 5A to 9B show, diagrammatically as a cross-section, possibilities of shape in order to carry out male and female elements of cells for storing power in accordance with the invention.
Figure 5B:
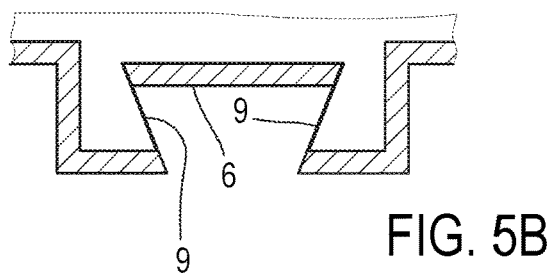

FIGS. 5A and 5B show respectively, as a cross-section, male 5 and female 6 elements that can be fitted by a dovetail principle.

Figure 6A:
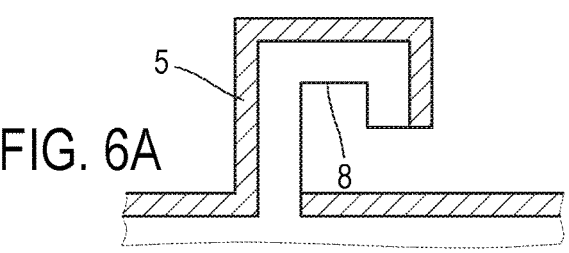
Figure 6B:
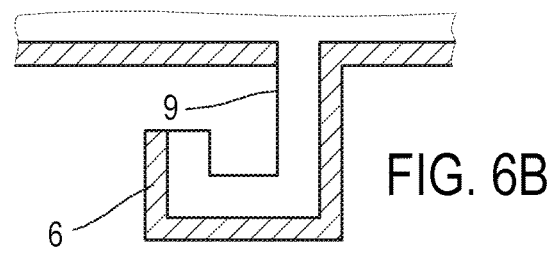

FIGS. 6A and 6B show respectively, as a cross-section, male 5 and female 6 elements that can be fitted by a hook principle with slot.

Figure 7A:
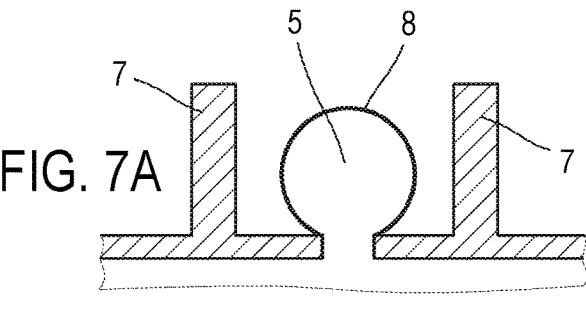
Figure 7B:
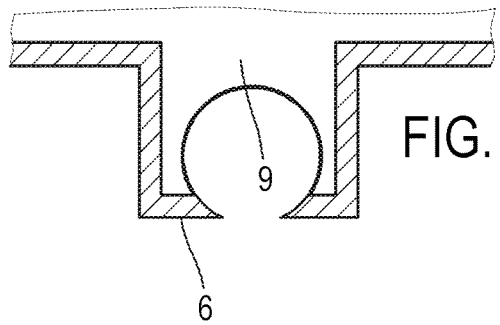

FIGS. 7A and 7B show respectively, as a cross-section, male 5 and female 6 elements that can be fitted by a cylindrical groove principle, in particular of circular section.

Figure 8A:
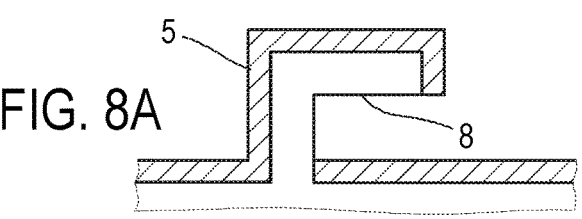
Figure 8B:
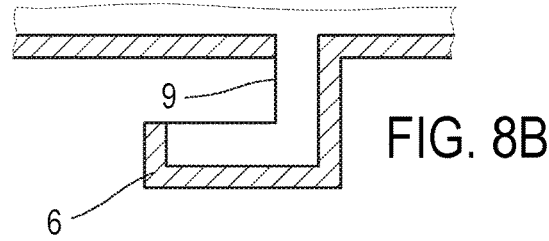

FIGS. 8A and 8B show respectively, as a cross-section, male 5 and female 6 elements that can be fitted by a hook principle.

Figure 9A:
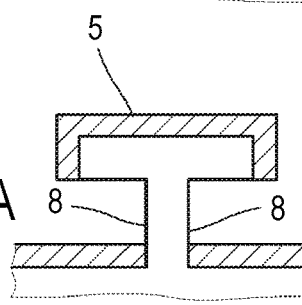
Figure 9B:
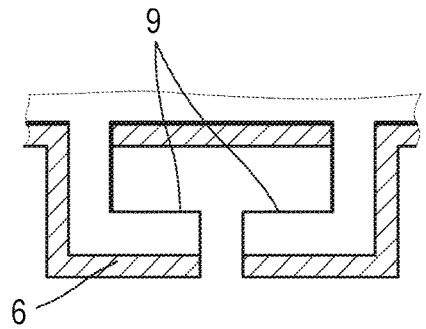

FIGS. 9A and 9b show respectively, as a cross-section, male 5 and female 6 elements that can be fitted par a principle with a "T" shape.

As explained hereinabove, the examples of FIGS. 5A and 7A can have lugs 7 on either side of the male element 5 in order to make it possible to further "mask" the electrical connection interface 8 and to limit the risks associated with an excessive exposure of the latter.

For the examples of FIGS. 6A, 8A and 9A, the low height of the space between the first surface and the male element 5 allowing for the assembly of the cell 1 makes the electrical connection interface 8 very difficult to access, in such a way that the presence of lugs 7 is not necessary.

Moreover, according to the chemical composition of the electrochemical core 10 of the cell 1, safety devices can be added in order to prevent over-pressure or external short circuits. More preferably, these safety devices are then placed at one end of the cell 1 behind an electrical connection interface, in portions that are not used for the electrical connection, even in the interstitial space between the cells 1 when it exists, i.e. the space that can separate two cells 1 assembled together, as shall be described in what follows.

Figure 10:
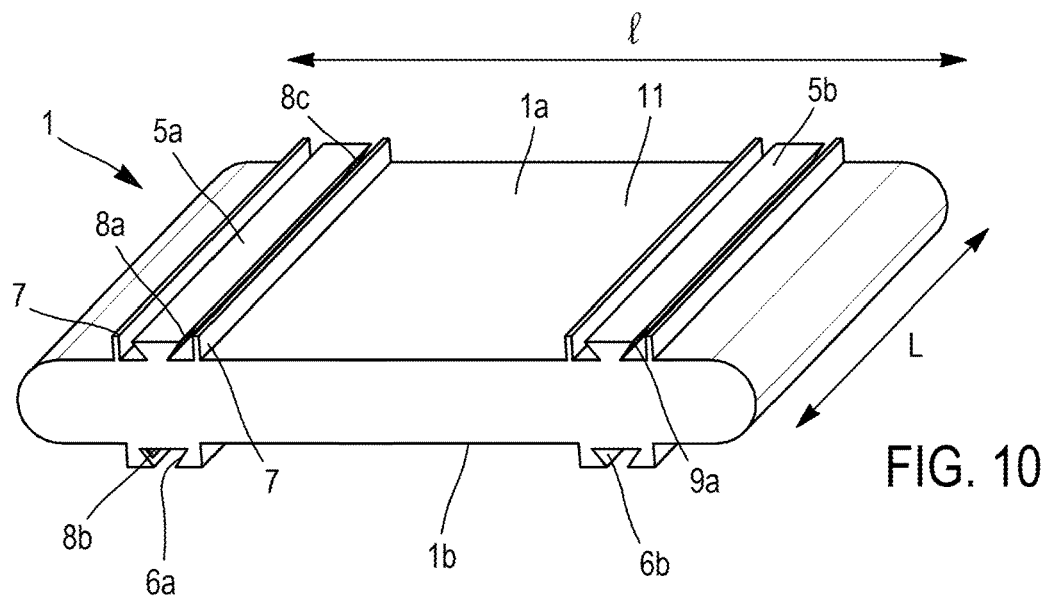
FIG. 10 shows, in perspective, a fourth embodiment of a cell for storing power in accordance with the invention.

FIG. 10 shows, in perspective, a fourth embodiment of an elementary electrochemical cell 1 in accordance with the invention.

In this example, the cell 1 comprises, on its first surface 1a, two male elements 5a and 5b that extend parallel to one another, from one edge to the other of the first surface 1a. In addition, the cell 1 comprises, on its second surface 1b, two female elements 6a and 6b that extend parallel to one another, from one edge to the other of the second surface 1b.

In this example, the male 5a, 5b and female 6a, 6b grooves parallel to each other have the form of a system with a dovetail. However, it can be otherwise, as explained hereinabove.

The male, 5a, 5b and female 6a, 6b grooves of the cell 1 make it possible to ensure both a fastening function of the cell 1 with another cell 1 of the same type, and also the electrical connection of the cell 1 with another cell 1 of the same type by the intermediary of the electrical connection interfaces 8a, 8b, 8c and 9a.

The male elements 5a and 5b, and the female elements 6a and 6b, are carried out directly by the packaging 11 that covers the electrochemical core 10 of the cell 1.

Advantageously, the packaging 11 can be carried out in a non-conductive and easy to implement material. For example, the packaging 11 can be carried out in a material that has the characteristics required for the safety of the cell 1, in particular in mechanical, thermal, electrical, resistance to fire, and other terms. The packaging 11 can for example be constituted by a thermoplastic or a thermosetting resin, loaded or not.

Advantageously, this type of cell 1 according to the invention can allow for the mounting of several cells 1 of the same type between them without having need for an additional connection part.

The choice and the positioning of the electrical connection interfaces 8a, 8b, 8c and 9a can be determined in such a way that the cells 1 can be connected in series or in parallel after rotating 180° one cell out of two.

Figure 11:
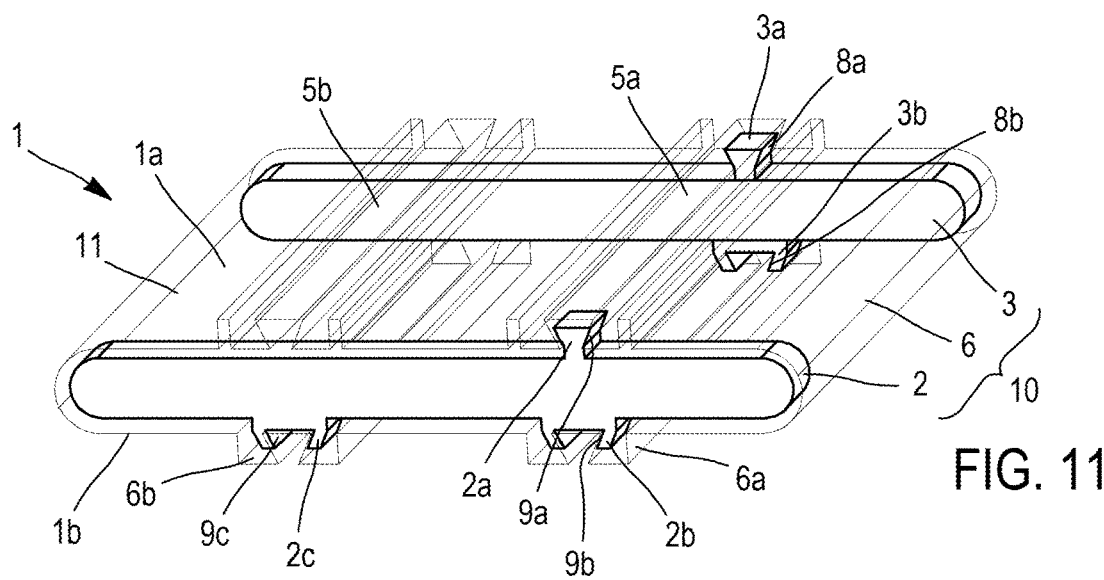
FIG. 11 shows, in perspective and diagrammatically, the composition of a cell of the type of that of FIG. 10.

FIG. 11 shows, in perspective and with the packaging 11 transparently, an example of a cell 1 in accordance with the invention of the type of that shown in FIG. 10, wherein the electrochemical core 10 of the cell 1 can be seen.

In particular, the electrochemical core 10 of the cell 1 comprises a negative electrode 2 and a positive electrode 3, with the whole being covered by the packaging 11, which allows for the formation of the male elements 5a and 5b and of the female elements 6a and 6b.

In this FIG. 11, similarly to the example of FIG. 10 but not identically, the negative electrode 2 comprises a male electrode element 2a and two female electrode elements 2b and 2c, and the positive electrode 3 comprises a male electrode element 3a and a female electrode element 3b.

The male electrode elements 2a and 3a make it possible to form the male element 5a of the cell 1, once the packaging 11 is set in place. The female electrode elements 2b and 3b make it possible to form the female element 6a of the cell 1, once the packaging 11 is set in place. Finally, the female electrode element 2c makes it possible to form the female element 6b of the cell 1, once the packaging 11 is set in place. The male element 5b of the cell 1 is formed by the packaging 11 without covering a male or female electrode element of the electrochemical core 10. In other words, the male element 5b of the cell 1 is useful only for the assembly of the cell 1 to another cell 1 of the same type, not for the electrical connection of the cell 1 to another cell 1 of the same type.

As such, the male electrode elements 2a and 3a respectively make it possible to form the electrical connection interfaces 9a and 8a of the male element 5a of the cell 1, by not covering these male electrode elements 2a and 3a with the packaging 11. Likewise, the female electrode elements 2b and 3b respectively make it possible to form the electrical connection interfaces 9b and 8b of the female element 6a of the cell 1, by not covering these female electrode elements 2b and 3b with the packaging 11. Finally, the female electrode element 2c makes it possible in the same way to form the electrical connection interface 9c of the female element 6b of the cell 1 by not covering the female electrode element 2c with the packaging 11.

In other words, this type of cell 1, such as shown for example in FIGS. 10 and 11, is provided in the following way: on, each one of the first 1a and second 1b surfaces of the cell 1, one of the two elements (male or female) has an opening on the positive electrode 3 and on the negative electrode 2 of the cell 1. In addition, on one of the surfaces, the second element (male or female) has only one opening on a single one of the electrodes (negative or positive), and on the other surface of the cell 1, the second element (male or female) does not have an opening on the positive and negative electrodes.

More precisely, in the example of FIG. 11, on the first surface 1a of the cell 1, the male element 5a has an opening on the positive electrode 3 and an opening on the negative electrode 2, and the male element 5b does not have any opening on the negative 2 and positive 3 electrodes. Sur the second surface 1b of the cell 1, the female element 6a has an opening on the negative electrode 2 and an opening on the positive electrode 3, and the female element 6b has an opening on the negative electrode 2.

As explained hereinabove, each opening on the positive electrode 3 or the negative electrode 2 is carried out in a protected portion of the male or female elements, which does not allow for the accidental introduction of an external element, for example the finger of an operator or any other conductive or non-conductive object.

Figure 12:
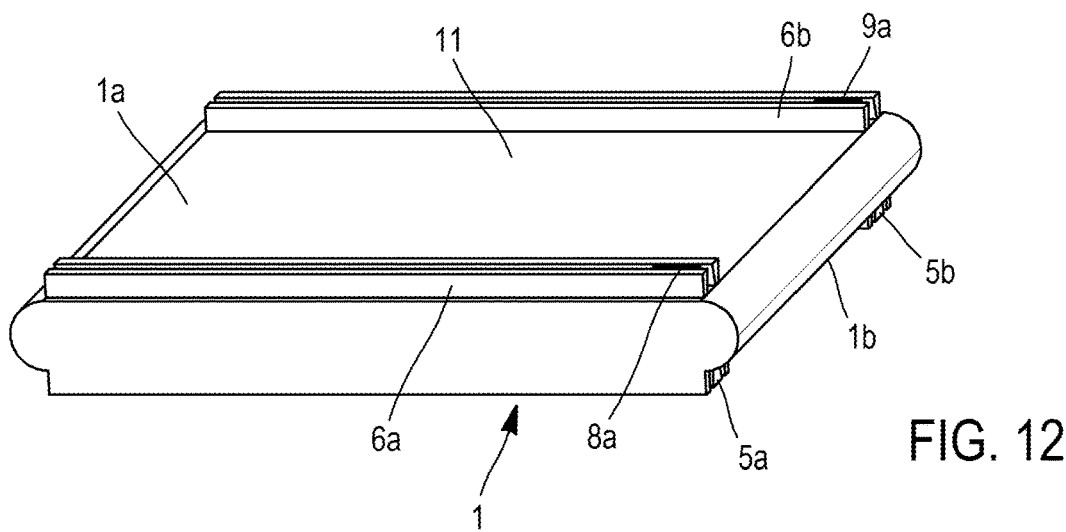
FIG. 12 shows, in perspective, a fifth embodiment of a cell for storing power in accordance with the invention.

While FIGS. 10 and 11 show an example of positioning of the male 5a, 5b and female 6a, 6b elements by extending along the length L of the cell 1, FIG. 12 shows a fifth embodiment of an elementary electrochemical cell 1 in accordance with the invention, wherein the male 5a, 5b and female elements 6a, 6b extending along the width I of the cell 1.

Moreover, in order to facilitate the carrying out of the cells 1, the male 5a, 5b and female elements 6a, 6b are preferentially positioned in such a way as to have at least one portion of the latter facing a bank 12 of the electrochemical core 10.

The electrical connection and the assembly between two cells 1 of the same type, or between a cell 1 and the module for assembling or the power storage system provided with male and female elements of the same type, can be done by sliding a cell 1 into another cell 1, or in the module for assembly or the power storage system, by the intermediary of the male 5a, 5b and female 6a, 6b elements.

However, instead of an assembly via a slide link, it could also be possible, in particular to save time, to carry out a fastening that can be fitted into by pressure by using for example an elastically deformable material and an adapted shape of the male and female elements.

Moreover, in order to prevent a displacement, caused for example to vibrations, movements, impacts, that can result in a degradation of the positive 3 and negative 2 electrodes by friction or diminution of the connection zone, the cells 1 can be maintained in position together.

Figure 13:
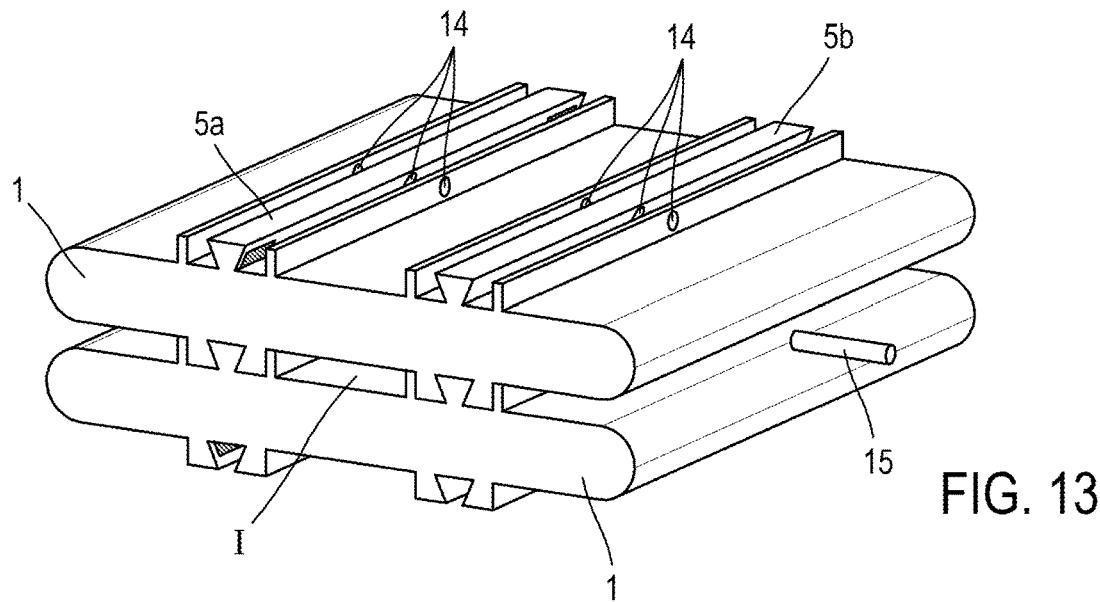
FIG. 13 shows, in perspective, a first principle of maintaining in position of cells for storing power in accordance with the invention.
Figure 14A:
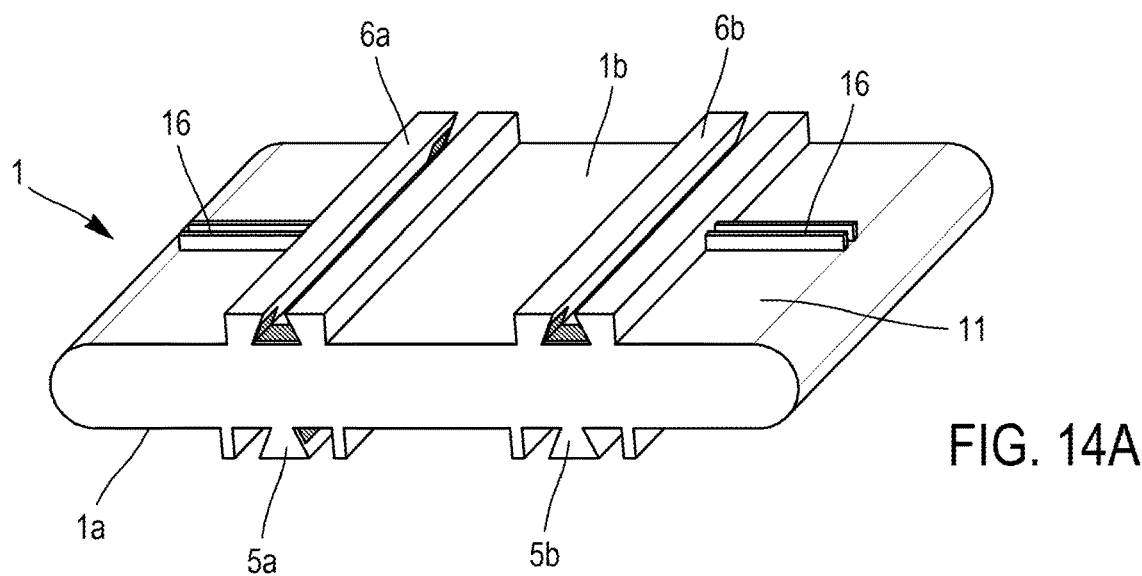
FIGS. 14A and 14B show, in perspective, a second principle for maintaining in position of cells for storing power in accordance with the invention.
Figure 14B:
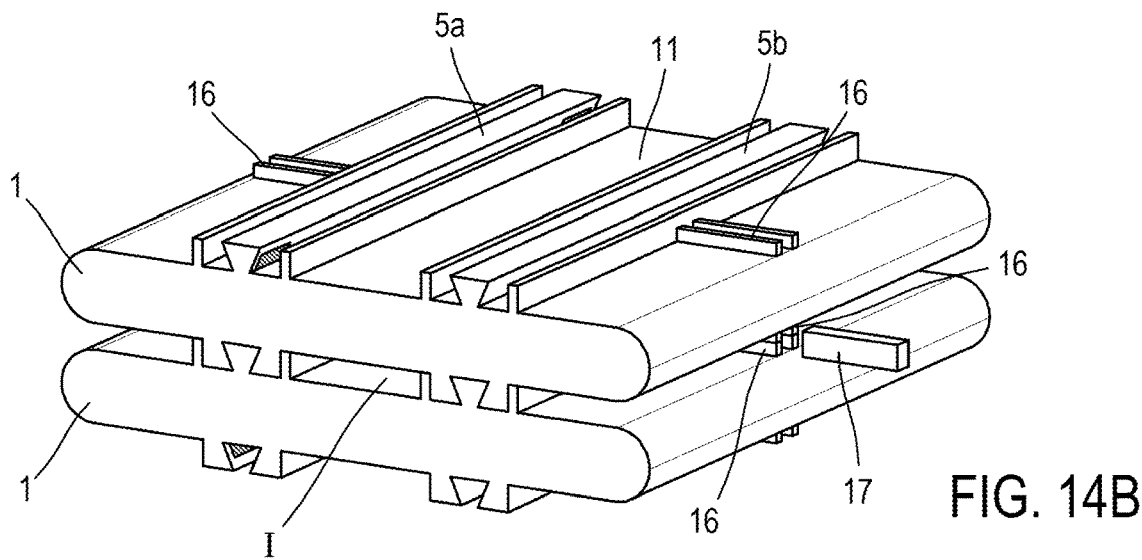

The maintaining in position can be carried out by the intermediary of means for maintaining in position such as described in reference to FIGS. 13, 14A and 14B.

This maintaining in position can for example be carried out by the use of an external fastening part such as a pin, a screw, a key or an extension peg.

FIG. 13 shows for example the possibility of having orifices 14 formed in the male elements 5a, 5b and the female elements 6a, 6b, in such a way that the orifices 14 are facing one another during the assembly. A rod for maintaining in position 15 can then be inserted through orifices 14 in order to allow for a maintaining in position of the cells 1 between them.

FIG. 14A shows moreover the possibility of providing on the surface of the first surface 1a and the second surface 1b of the cell 1 grooves for maintaining in position 16, for example formed by the packaging 11.

During the assembly of the cells 1 together, as shown in FIG. 14B, the grooves 16 are positioned with regards to one another, and a part for maintaining in position 17, for example a key, can be inserted between the grooves for maintaining in position 16 in such a way as to finalise the fastening of the cells 1 together.

As such, as shown in FIGS. 14A and 14B, specific shapes can in general be provided on the packaging 11 of the cells 1 that supplement one or several external fastening parts. The grooves 16 can in particular be formed perpendicularly to the male elements 5a, 5b and to the female elements 6a, 6b, in order to allow for the insertion of the part for maintaining in position 16 preventing translation. Alternatively, it would also be possible to use a housing with notches for off-centre fastening.

The maintaining in position of the cells 1 between them can also be carried out on male elements 5a, 5b or on female elements 6a, 6b by adding and/or deformation of material. It can for example be possible to use methods such as plastic welding, punching or FSW welding (Friction Stir Welding). It can also be possible to weld and/or to punch an exterior plate on the surface of the assembly of the cells 1.

Likewise, these principles for maintaining in position described hereinabove can be applied for the assembly of the cells 1 with the module for assembling and/or the power storage system. Finally, another method could consist in carrying out forms in the module for assembly and/or the power storage system, wherein the cells 1 can be maintained, by forced mounting.

Advantageously, with the elementary electrochemical cells 1 of the type of those shown in FIGS. 10 to 14B, it is possible to carry out a mounting in series or in parallel of the cells 1 together according to the direction in which they are slid into one another.

The modularity of the mounting is permitted by an adapted positioning of the positive and negative electrical connection interfaces. As such, one of the two positive and negative electrodes has a connection in each one of the two male or female elements of one of the surfaces and a connection in a single male or female element of the opposite surface, while the second positive or negative electrode has a connection solely in a male or female element of each surface, the two connections of the second positive or negative electrode being positioned in the two facing male or female elements which have a connection with the first positive or negative electrode.

By way of example, FIGS. 15A to 18B show examples of assembly of two elementary electrochemical cells 1 in accordance with the invention, of the type comprising two male elements 5a, 5b extending in parallel over a first surface of the cell 1 and two female elements 6a, 6b extending in parallel over a second surface of the cell 1.

Figure 15A:
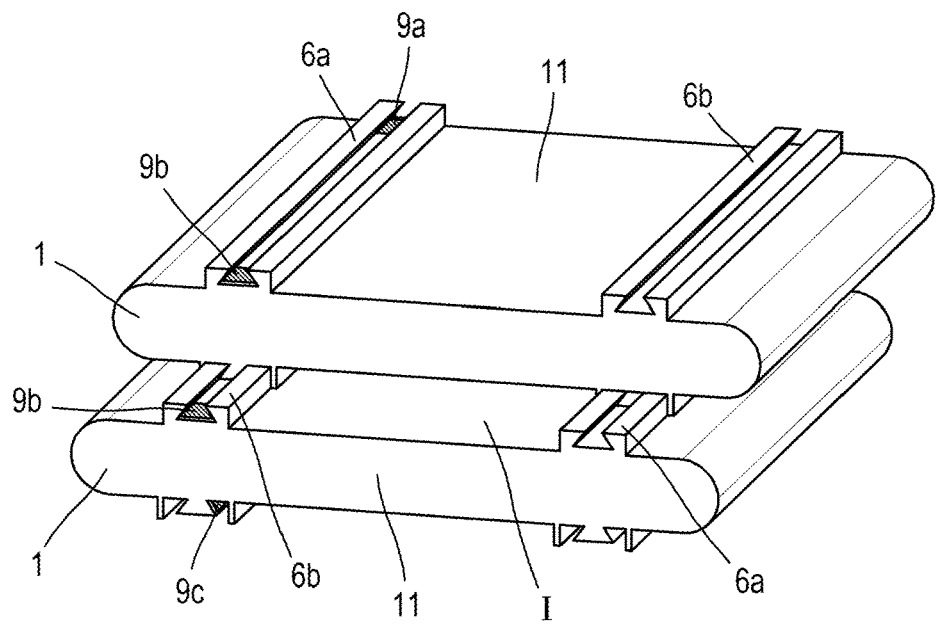
FIGS. 15A and 15B show, respectively with non-visibility and visibility in transparency of the electrochemical cores of the cells, a bottom view of an assembly in parallel of two cells for storing power in accordance with the invention.
Figure 15B:
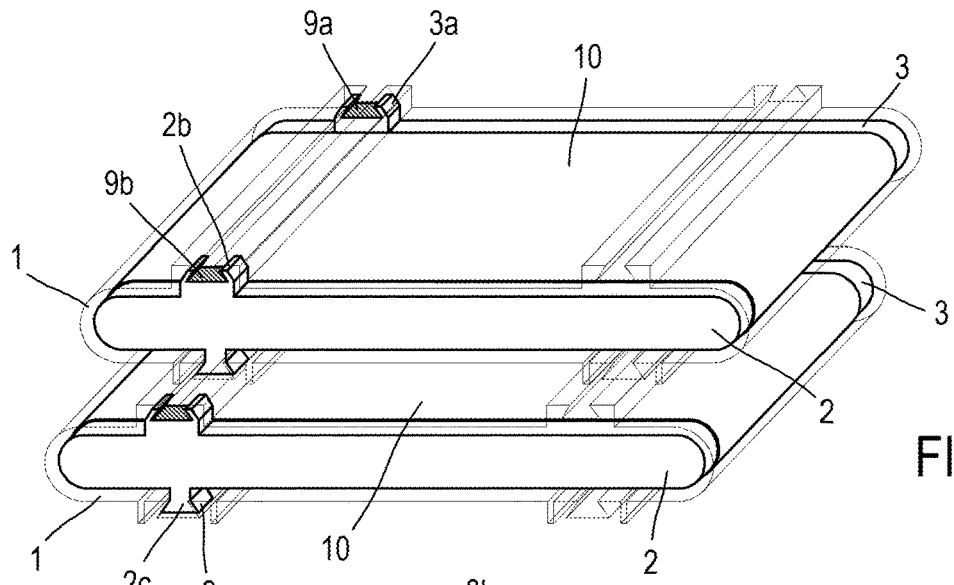

FIGS. 15A and 15B show for example a bottom view of an assembly in parallel of two cells 1, FIG. 15B showing the electrochemical core 10 of the cells 1.

Figure 16A:
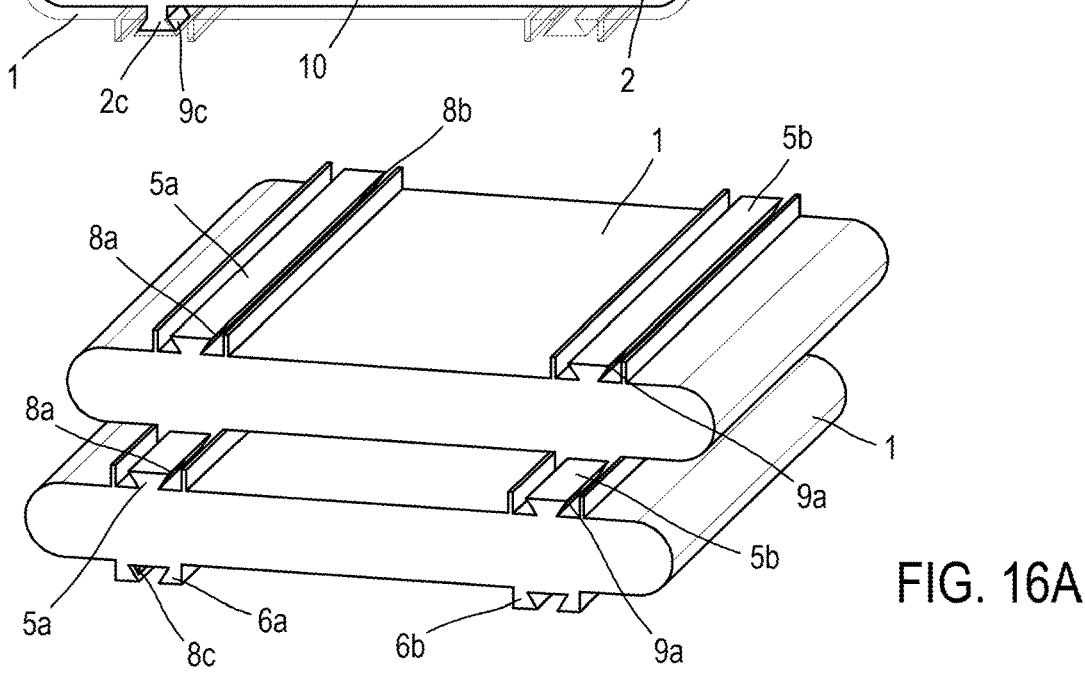
FIGS. 16A and 16B show, respectively with non-visibility and visibility in transparency of the electrochemical cores of the cells, a top view of the assemblage in parallel of the two cells of FIGS. 15A and 15B, FIGS. 17A and 17B show, respectively with non-visibility and visibility in transparency of the electrochemical cores of the cells, a top view of the assembly in series of two cells for storing power in accordance with the invention.
Figure 16B:
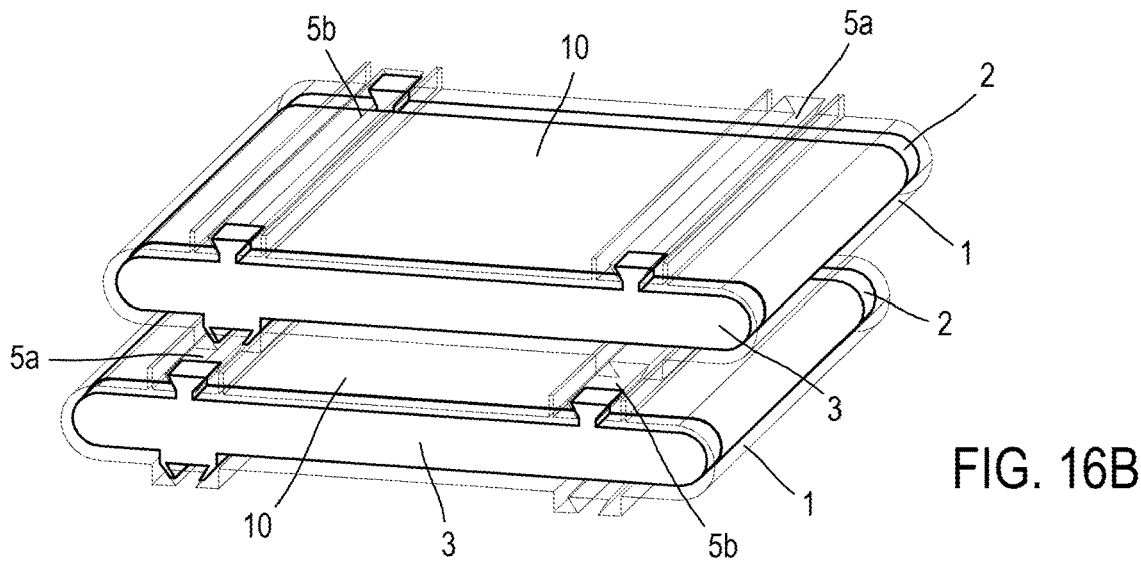

FIGS. 16A and 16B show a top view of the assembly of FIGS. 15A and 15B.

Figure 17A:
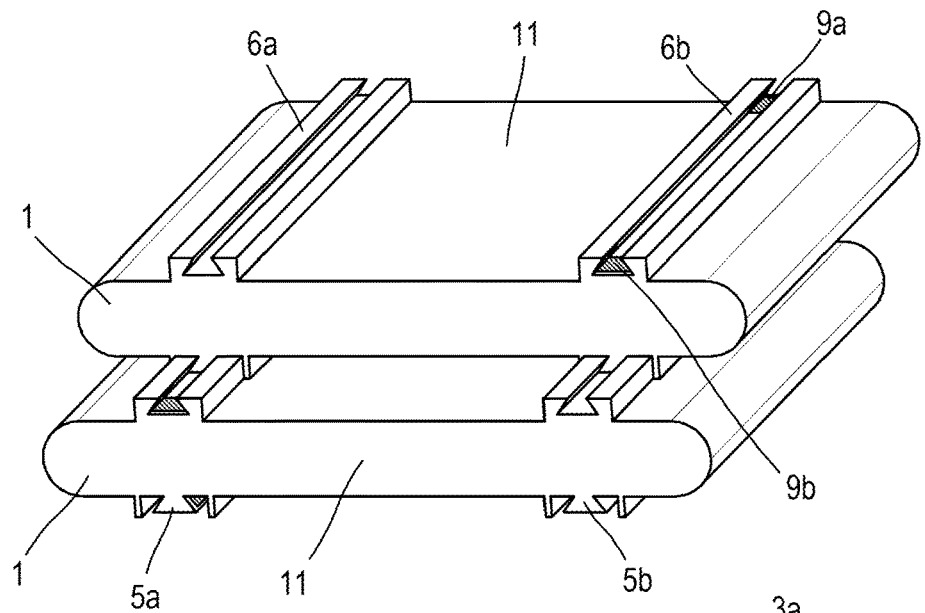
Figure 17B:
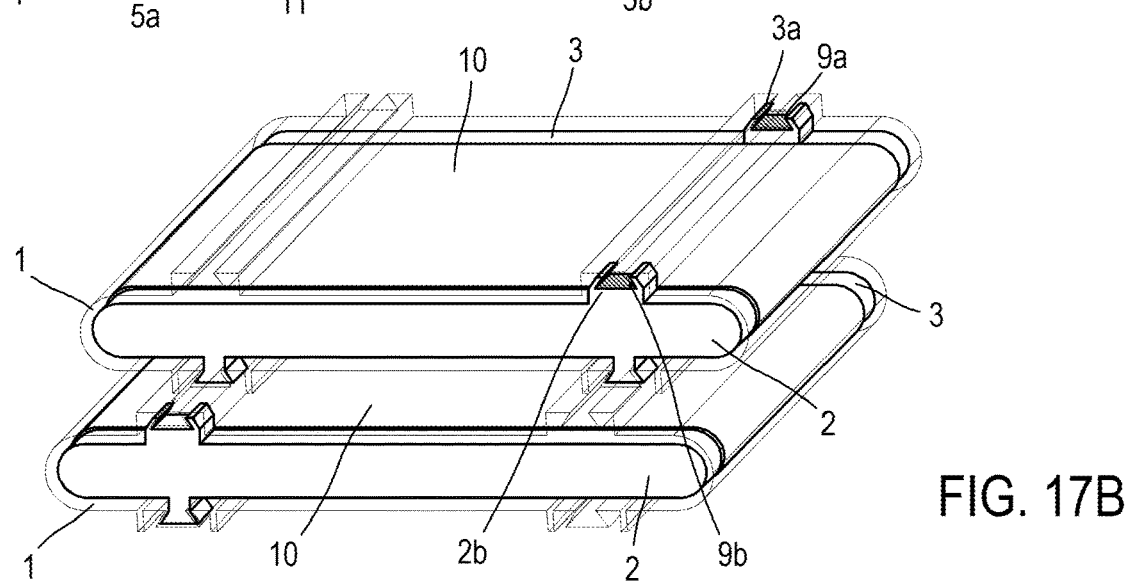

FIGS. 17A and 17B show a top view of an assembly in series of two cells 1 in accordance with the invention, FIG. 17B showing the electrochemical core 10 of the cells 1.

Figure 18A:
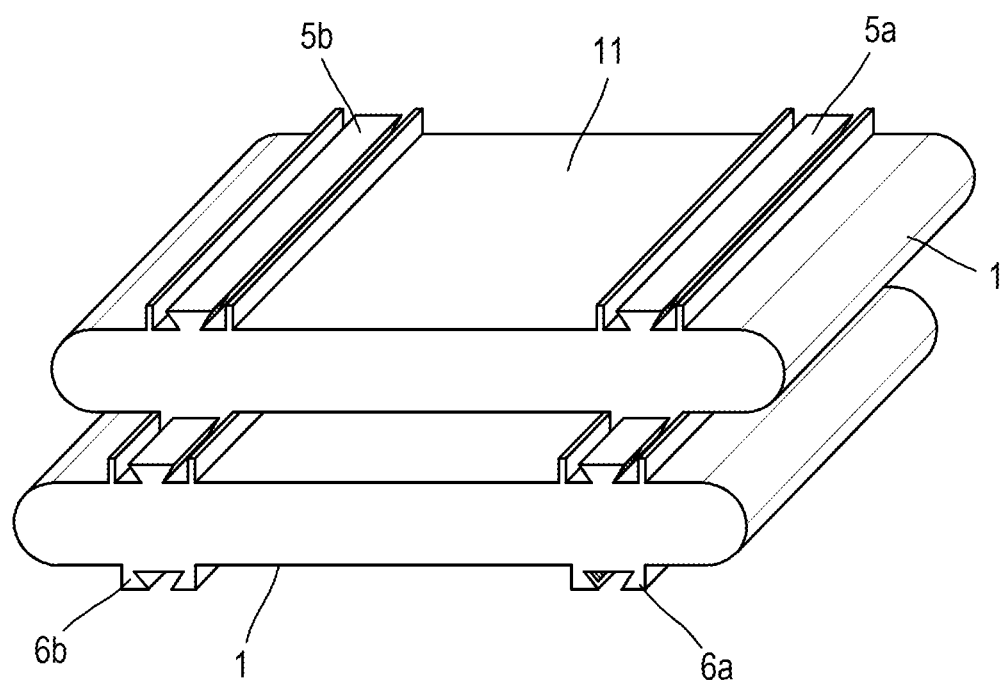
FIGS. 18A and 18B show, respectively with non-visibility and visibility in transparency of the electrochemical cores of the cells, a bottom view of the assembly in series of the two cells of FIGS. 17A and 17B.
Figure 18B:
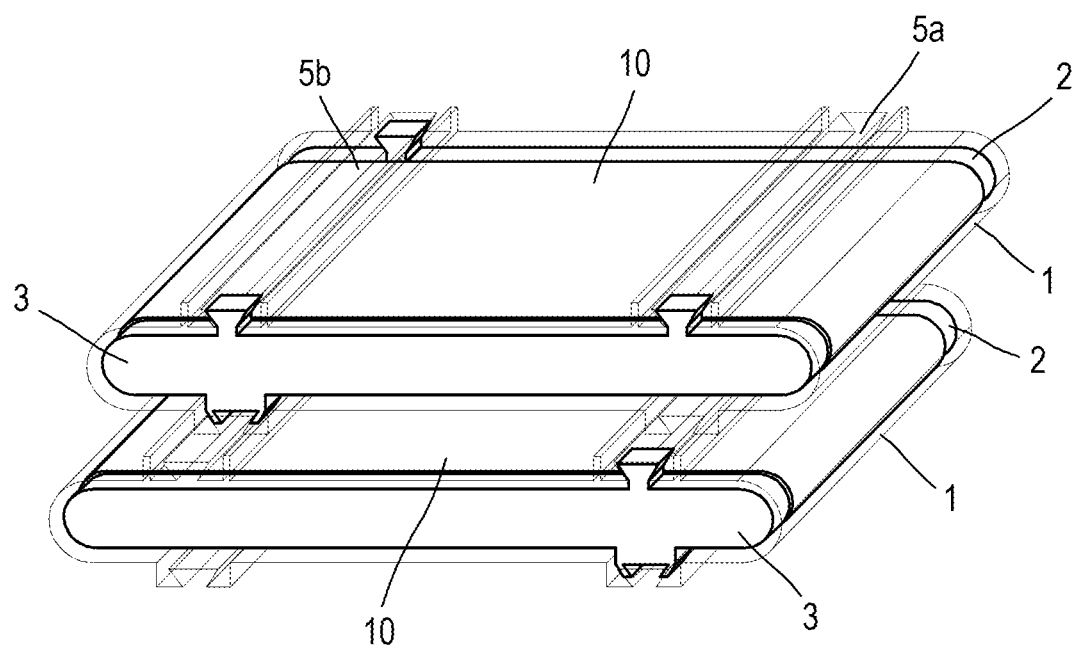

FIGS. 18A and 18B show a bottom view of the assembly of the two cells 1 of FIGS. 17A and 17B.

As can be seen in FIGS. 10A to 18B, the assembly of two cells 1 of the type comprising male elements 5a, 5b parallel to one another and female elements 6a, 6b parallel to one another will generate the appearance of interstitial spaces I between the cells 1, due to the height of the male elements 5a, 5b and of the female elements 6a, 6b. These interstitial spaces I are according to the dimensions and the use of the cells 1 (power or current elements).

However, these interstitial spaces I can be used to integrate for example a cooling element or other, with the cooling element able for example to be a cold plate, a heat pipe system, a heat-transfer fluid system and/or a thermal conduction system.

Figure 19:
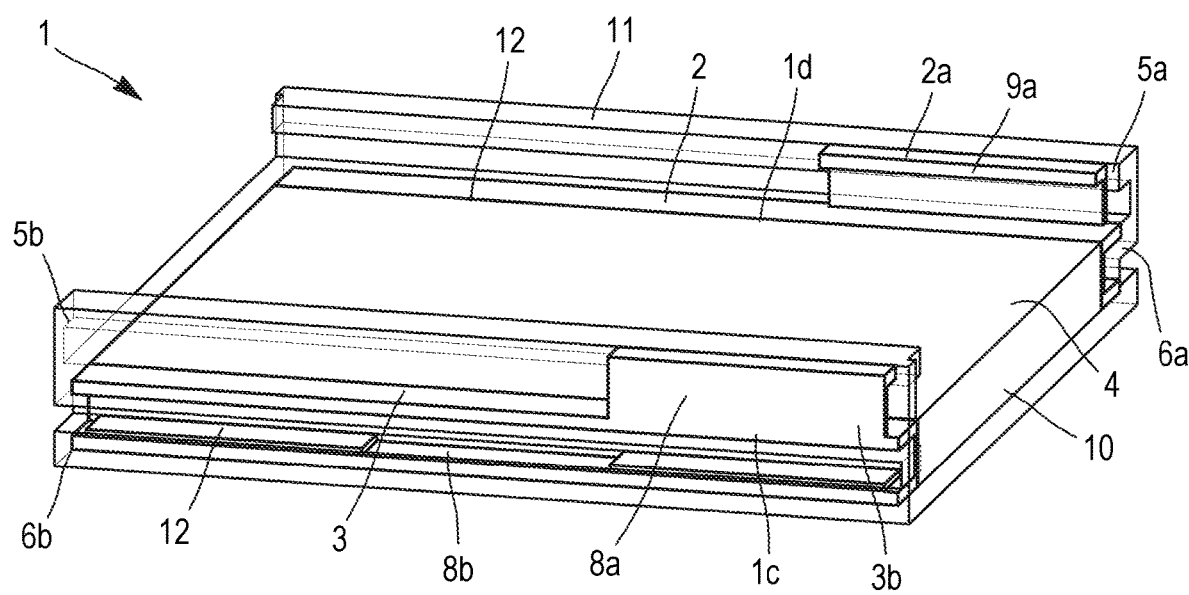
FIG. 19 shows, in perspective and with visibility of the electrochemical core, a sixth embodiment of a cell for storing power in accordance with the invention.

Moreover, FIG. 19 shows, in perspective and with visibility of the electrochemical core 10 of the cell 1, a sixth embodiment of an elementary electrochemical cell 1 in accordance with the invention.

In this example, a first lateral surface 1c of the cell 1 comprises both a male element 5b and a female element 6b, the male element 5b extending from an edge of the first surface 1c. Furthermore, the second surface 1d of the cell 1 comprises both a male element 5a and a female element 6a, the male element 5a extending from an edge of the second surface 1d.

The electrochemical core 10 is formed by a negative electrode 2 and a positive electrode 3, between which is located an electrolyte 4 for the carrying out of the electrochemical reaction.

The positive electrode 3 comprises a male electrode element 3b making it possible to form the electrical connection interface 8a of the male element 5b, and the negative electrode 2 comprises a male electrode element 2a making it possible to form the electrical connection interface 9a of the male element 5a. In addition, the female elements 6a and 6b can comprise electrical connection interfaces 9b and 8b formed, at least partially, directly by the negative 2 and positive 3 electrodes.

Advantageously, the male elements 5a, 5b and the female elements 6a, 6b are positioned on banks 12 of the electrochemical core 10.

Advantageously, the double groove system (or male-female double elements) on each lateral surface of the cell 1 makes it possible to suppress the interstitial spaces I appearing between the cells 1 during the assembly.

For the sizing of the electrical connection interfaces 8, 9 allowing both for the safety and the proper operation of the cell 1, two values can be sized: the maximum separation of the opening of a groove (male 5 or female 6) and the surface limiting the passage of the current. The sizing of a pair of grooves 5 or 6 on a surface of the cell 1 is carried out over the greatest maximum separation of the opening of one of the two grooves, although it is carried out on the smallest surface limiting the passage of the current, the surface limiting the passage of the current being the smallest surface perpendicular to the flow of the current.

According to the geometry and the dimensions of the electrical connection interfaces, this surface is the smallest of the surfaces between: the contact surface, the surface of the conductive portion exiting the insulation of the male element 5 or the sum of the conductive surfaces exiting from the insulation of the female element 6.

Advantageously, the surface limiting the passage of the current is determined by a thermal calculation according to the electrical and thermal characteristics of the conductor, of the insulation and of the environment. A first sizing can be carried out by using a maximum current density of 5 $A \cdot mm^{-2}$ in the copper, of 3 $A \cdot mm^{-2}$ in the aluminium and of 1.15 $A \cdot mm^{-2}$ in the nickel. So as to not be able to accidentally insert an object into the male 5 or female 6 element, the maximum separation of the opening is preferentially less than or equal to 5 mm.

Embodiments of the method of manufacturing in accordance with the invention shall now be described hereinafter. In these examples, the electrical core is an electrochemical core 10 and the cell is an electrochemical cell 1, although this is in no way limiting.

First of all, FIGS. 20A to 20G show, in perspective, different successive steps of implementing a first alternative of the method in accordance with the invention.

The first alternative of the method consists, using an electrochemical core 10 in the form of a stack or of a spool placed in an injection mould, in overmoulding the various portions of the cell 1 and of the packaging 11, as well as injecting the electrolyte 4 inside the electrochemical core 10.

This first alternative has for objective the complete manufacture of the cell 1 without requiring removing it from the mould.

In the case of an electrochemical core 10 in the form of a stack, the latter is preferentially carried out in such a way as to have the two banks 12 exceeding respectively on one side and on the other side.

Figure 20A:
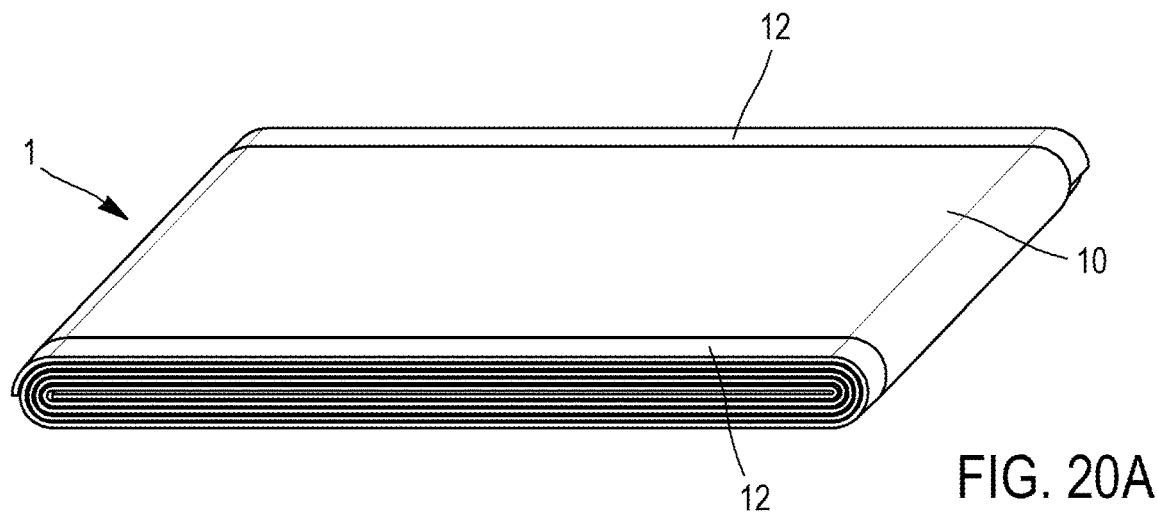
FIGS. 20A to 20G show, in perspective, different successive steps of implementing a first alternative to the method of manufacture in accordance with the invention.

FIG. 20A shows the first step of the first alternative with an electrochemical core 10 in the form of a spool.

This first step of carrying out the cell 1 consists in placing the electrochemical core 10 in a mould. The banks 12 are located on each side of the electrochemical core 10.

Figure 20B:
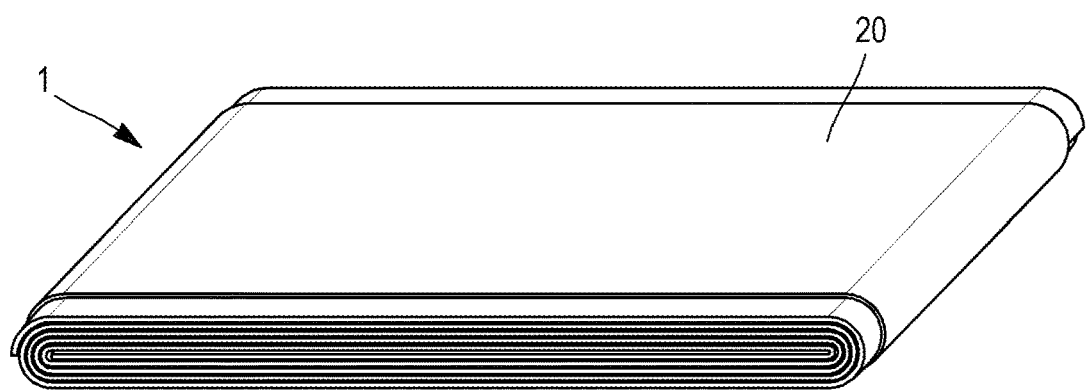

FIG. 20B shows the second step of the first alternative. In this second step, an insulating material, in particular a film made of an insulating material 20, is overmoulded around the electrochemical core 10, ensuring that the banks 12 are left free of material.

The film made of a material 20, that is insulating, sealed and chemically stable with regards to the electrolyte can in particular be chosen from polyethylene (PE), polypropylene (PP), polyetheretherketone (PEEK), polyetherarylketone (PEAK), polyethylene terephthalate (PET), polytetrafluoroethylene (PTFE), among others.

Figure 20C:
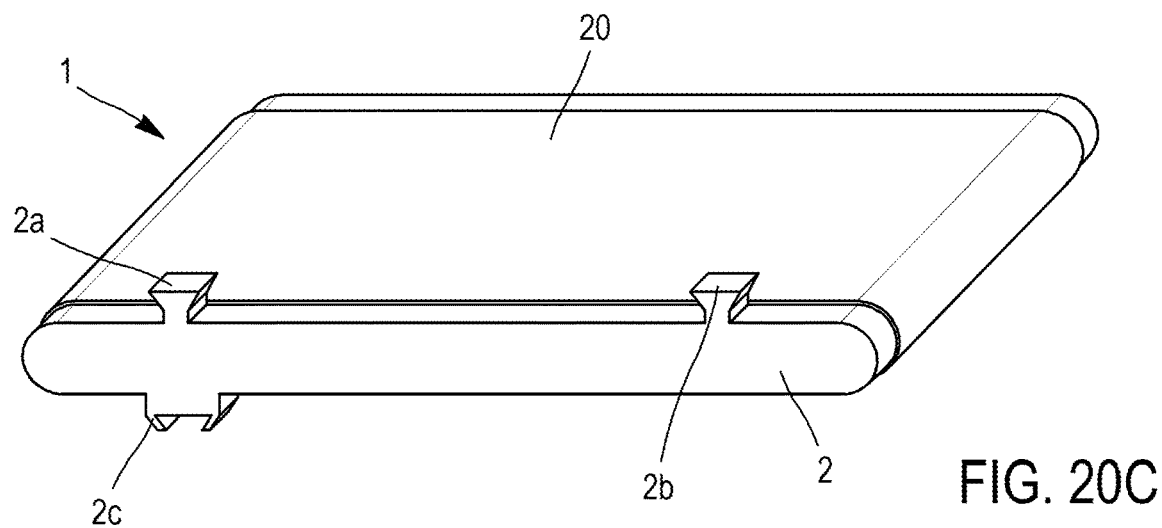

FIG. 20C shows the third step of the first alternative. In this third step, a powder metallurgy method (PIM, for "Powder Injection Moulding") is used to inject a terminal into a conductive material around the bank 12 of the anode in order to form the negative electrode 2, comprising for example two male electrode elements 2a and 2b, and a female electrode element 2c.

The PIM method consists in injecting a mixture of powder of metal, ceramic or other materials with a polymer binder. This method requires, after injection, a step of "debinding" in order to remove the binder and a step of sintering in order to obtain its final properties. These two steps can be carried out at the same time.

The terminal can be injected for example with a mixture of copper or aluminium and a binder.

The use of this PIM method can allow for the injection in a single part of the terminal with the final shape desired and can make it possible to eliminate all additional part requiring an assembly.

Figure 20D:
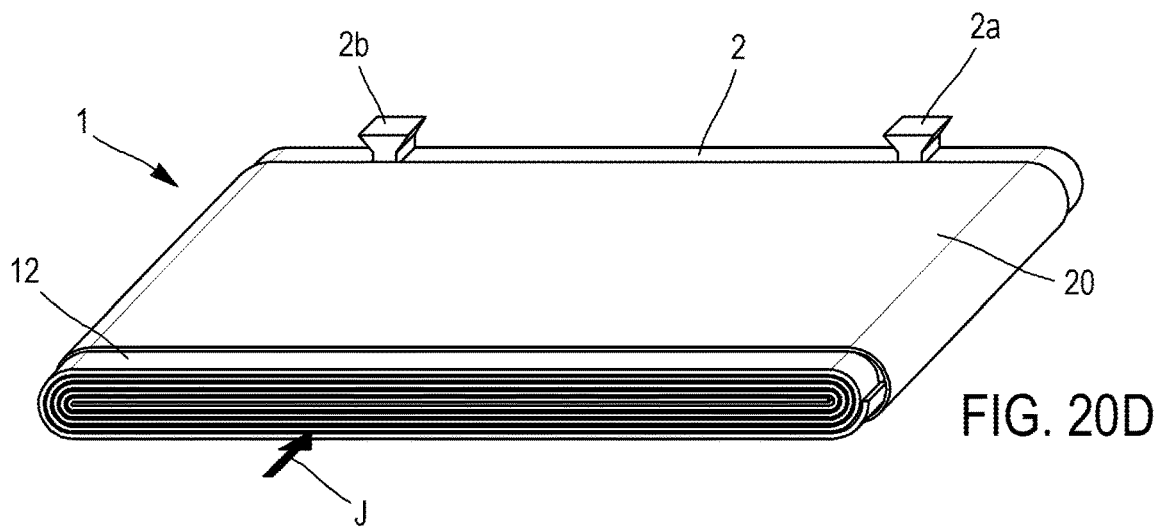

FIG. 20D shows the fourth step of the first alternative of the method according to the invention. This fourth step is the step of filling with electrolyte 4 of the cell 1, symbolised by the arrow J, with the required quantity of electrolyte 4 for the proper operation of the cell 1.

For the filling with electrolyte 4, several methods are possible. As such, by working as vacuum injection in the mould, a method of depression can be used. Likewise, by working with a neutral atmosphere (for example with argon), the electrolyte 4 can be injected under pressure.

Figure 20E:
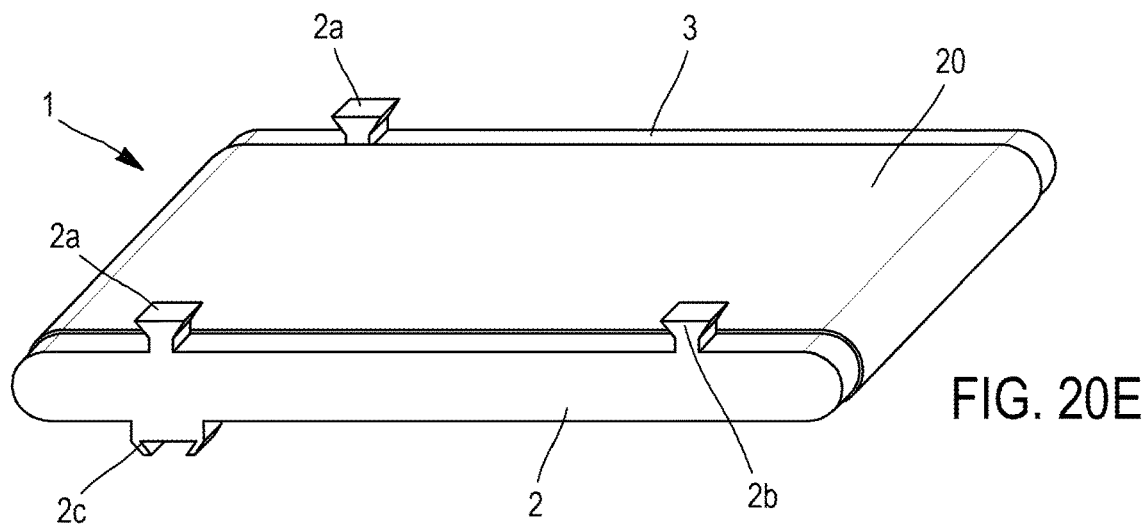
Figure 20F:
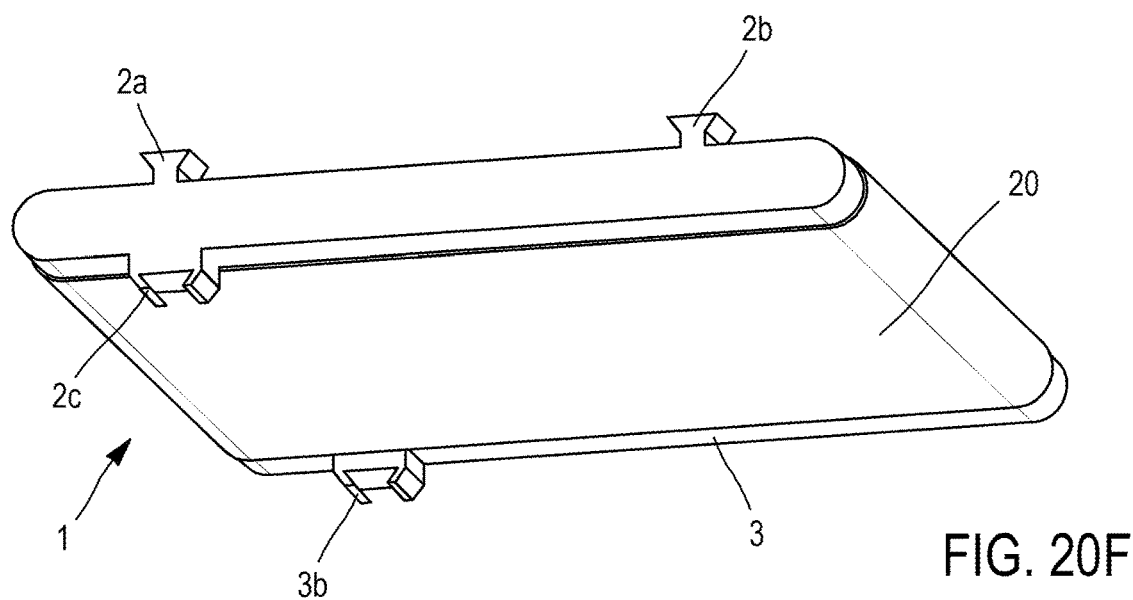

FIGS. 20E and 20F show, respectively as a top view and as a bottom view, the fifth step of the first alternative of the method according to the invention. The fifth step, once the cell 1 is filled with electrolyte 4, consists in injecting the second terminal on the cathode, by a PIM method similar to that of the first terminal, in order to form the positive electrode 3 provided for example with a male electrode element 3a and with a female electrode element 3b. This terminal is as such injected at the final shape desired, comprising the shape of the connector. This terminal is injected using a mixture of aluminium or nickel powder and of a binder.

In order to prevent the degradation of the electrolyte 4, the binder used must allow for a "debinding", either via solvent, at low temperature (less than 90° C. according to the electrolyte 4), or by the use of solvent in supercritical conditions. The sintering used is carried out by a method without increasing the temperature (for example photonic, alpha sintering, among others), or by a method causing only a local heating (microwaves, SPS method for "Spark Plasma Sintering", among others). Alloy materials can also be added in the materials of the terminals in order to reduce their melting temperature (for example silver, zinc, lead, tin for copper). A method with local heating can be supplemented by a cooling system in order to not degrade the electrolyte 4. As mechanical characteristics are not necessarily sought, it is also possible to directly use the so-called "green parts" (part at injection output without "debinding" or sintering) or "brown" (part at injection output with "debinding" but no sintering).

Figure 20G:
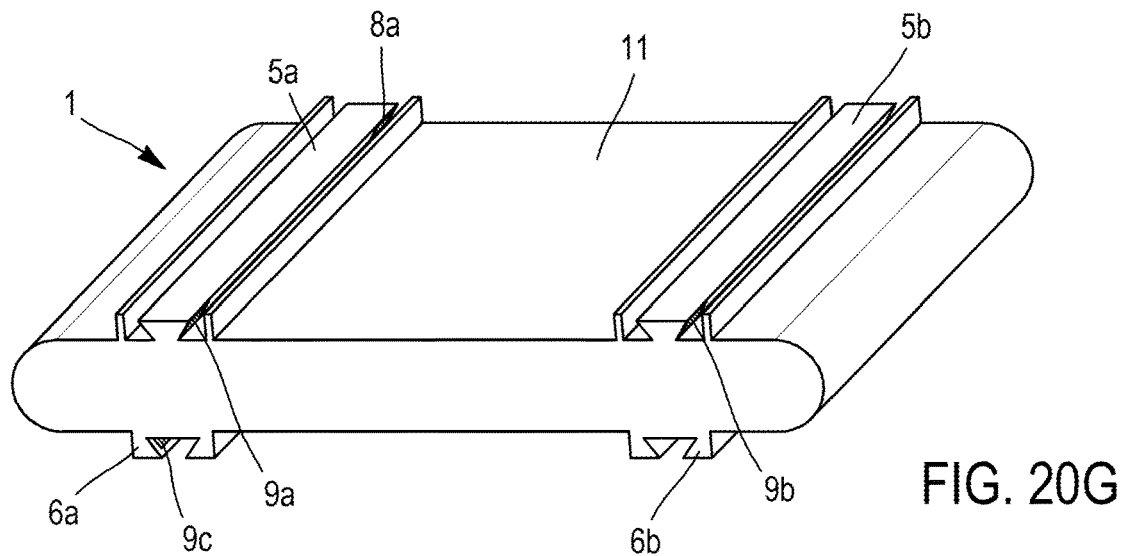

FIG. 20G shows the sixth step of the first alternative of the method according to the invention. This sixth step corresponds to the injection of the packaging final 11.

The packaging 11 is directly overmoulded on the electrochemical core 10 and the terminals. It is set to the form of the male 5a, 5b and female 6a, 6b elements, and leaves the openings required for the connection in the masked portion of these male 5a, 5b and female 6a, 6b elements, in order to form electrical connection interfaces with positive 8a and negative 9a, 9b, 9c polarity, for example either by a system of drawers, or using cores. This packaging 11 can be carried out using all of the materials that respond to the mechanical, thermal, and electrical requirements, and other conditions of use of the targeted application. It can as such be considered for example a thermosetting resin (epoxy, vinylic, methacrylics, silicone, polyurethane, polyimides, phenolic, formica, Bakelite, unsaturated polyesters, among others) or a thermoplastic resin (ABS, HDPE, LDPE, LLDPE, PA, PEEK, PE, PET, PETE, PC, PMMA, POM, PP, PS, PPS, PTFE, PVC, among others), loaded with fibres or reinforced by a woven or non-woven matrix, for example carbon, aramid, glass, ceramics (boron nitride, silicon carbide, alumina, silicon oxide, mullite, aluminium nitride, silicon nitride, zirconium oxide, zirconia), bio-sourced fibres (flax, hemp, nettle, banana tree, coconut, palm tree, date palm, bamboo), among others. In order to modify the characteristics of this material, fillers or additives can be added.

In this first alternative of the method according to the invention, all of the steps carried out after the filling of the electrolyte 4 must be preferentially carried out at low temperature in order to prevent any degradation of the electrolyte 4. The anode being constituted of metal at a higher melting, which therefore requires a higher sintering temperature, is carried out first. Use can also be made of materials having a low solidification temperature, methods without emission of temperature of local heating.

The FIGS. 21A to 21H show, in perspective, different successive steps of implementing a second alternative of the method in accordance with the invention.

This second alternative of the method according to the invention consists in carrying out the steps of powder metallurgy (PIM) before the overmoulding of the film in insulating material 20 of neutral chemical protection and of the filling with 4. This second alternative can be carried out in a first mould dedicated to the steps of the PIM operation, which makes it possible to reduce the complexity of the injection mould and to use conventional sintering methods at a higher temperature less complex. One or several holes 21 must then be left on one of the terminals for the filling of the electrolyte 4.

As for the first alternative of the method according to the invention in the case of the use of a stack, the latter is carried out in such a way as to have the banks 12 exceeding the sides of the positive and negative terminals.

In the examples of FIGS. 21A to 21H, a wound electrochemical core 10 is used.

Figure 21A:
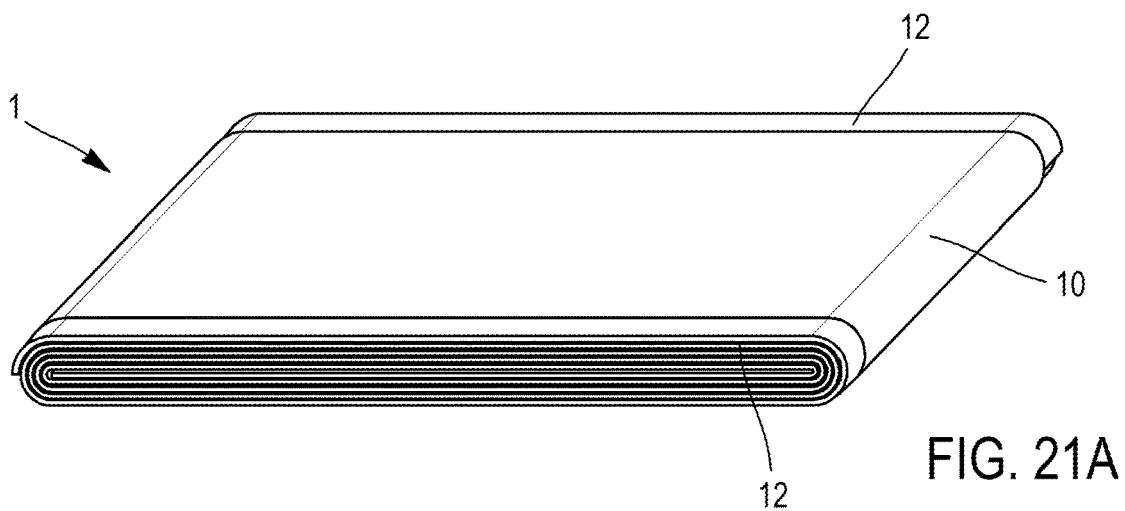
FIGS. 21A to 21H show, in perspective, different successive steps of implementing a second alternative to the method of manufacture in accordance with the invention.

FIG. 21A shows the first step of the second alternative of the method according to the invention. In this first step, the electrochemical core 10 is placed in a mould. The banks 12 are located on each side of the electrochemical core 10.

Figure 21B:
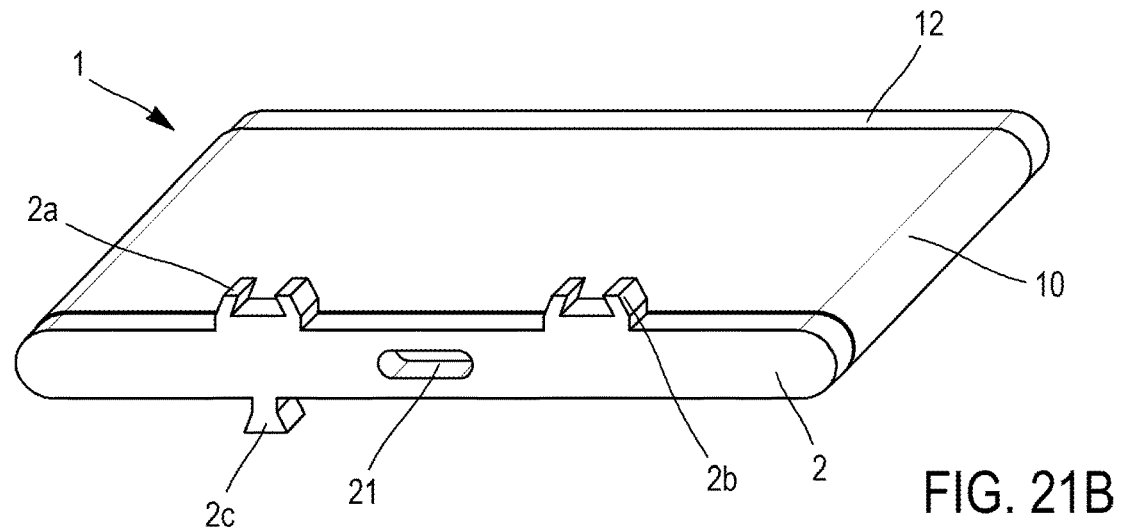

FIG. 21B shows the second step of the second alternative of the method according to the invention. This second step consists in using a PIM method to inject using a conductive material, a terminal around the bank 12 of the anode in the final shape desired in order to form the negative electrode 2 comprising female electrode elements 2a and 2B and a male electrode element 2c. This terminal is injected and sintered with one or several holes 21 in order to allow for the filling of the electrolyte 4 in a following step. According to the chemistry of the cell 1, the terminal can be injected with a mixture of copper or aluminium with a binder.

Figure 21C:
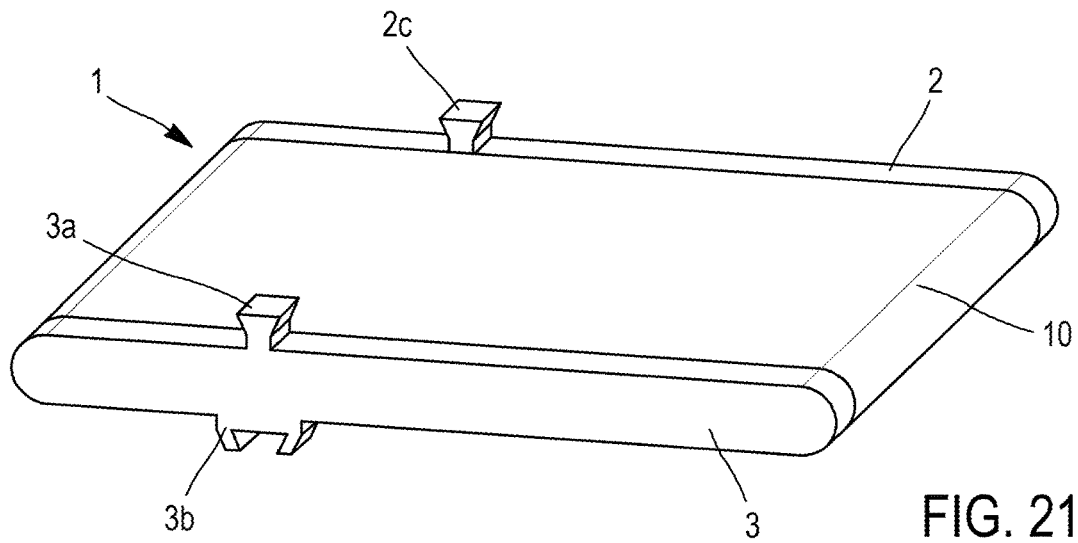
Figure 21D:
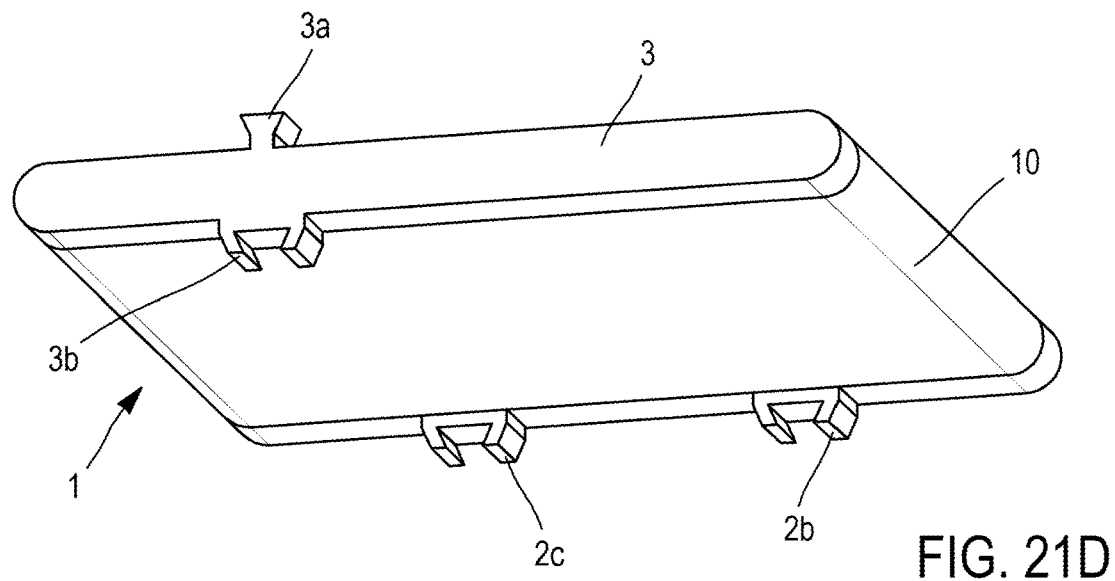

FIGS. 21C and 21D show, respectively as a top view and as a bottom view, the third step of the second alternative of the method according to the invention. This third step consists in injecting the second terminal on the cathode by the same PIM method as for the first. This terminal, like the preceding one, is injected at the final shape desired, comprising the shape of the connector, in order to form the positive electrode 3 comprising a male electrode element 3a and a female electrode element 3b. This terminal is injected using a mixture of aluminium powder and a binder.

Figure 21E:
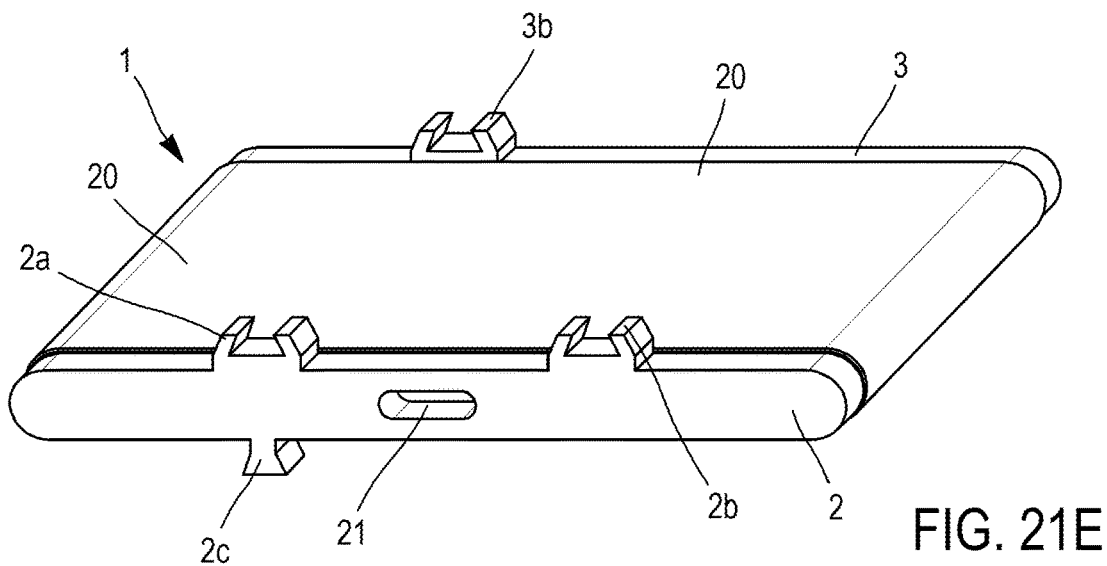

FIG. 21E shows the fourth step of the second alternative of the method according to the invention. In this fourth step, the electrochemical core 10 is placed in a mould and around the latter a film is overmoulded made of an insulating material 20, sealed and chemically stable with regards to the electrolyte 4 while still leaving the terminals free of material.

Figure 21F:
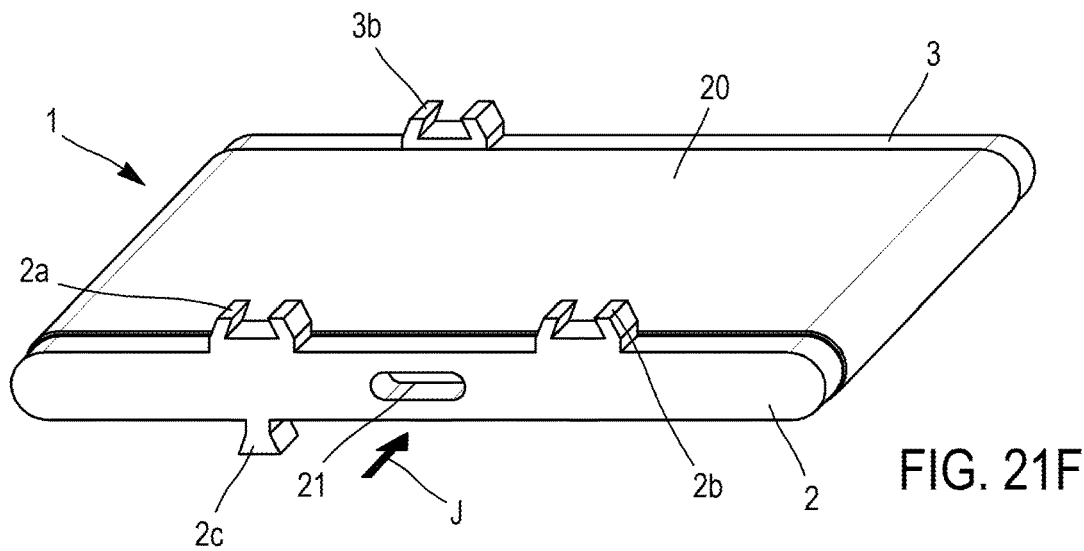

FIG. 21F shows the fifth step of the second alternative of the method according to the invention. In this fifth step, the cell 1 is filled with the electrolyte 4, diagrammed by the arrow J, required for the proper operation thereof. For the filling, several methods are possible, as described above.

Figure 21G:
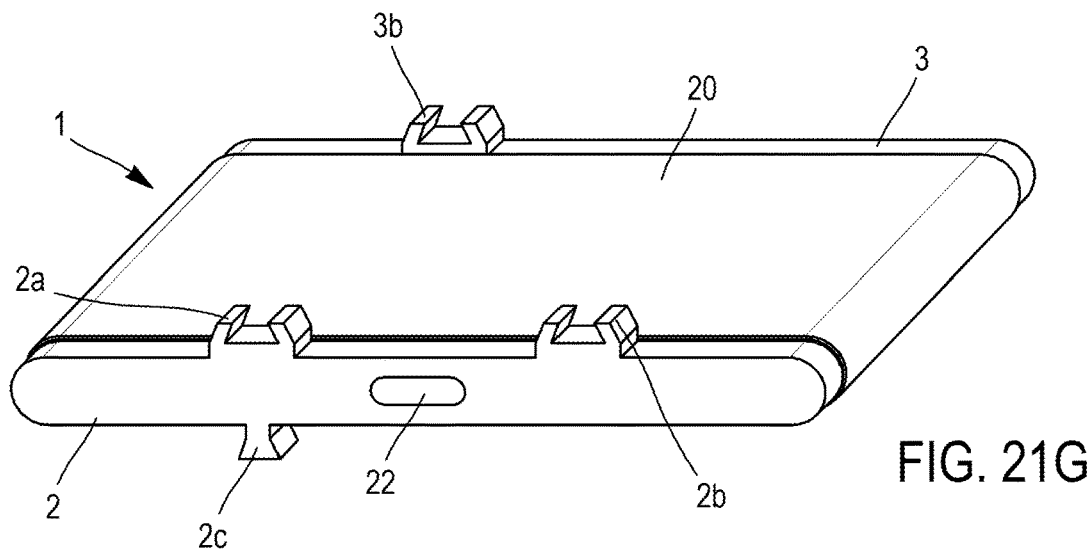

FIG. 21G shows the sixth step of the second alternative of the method according to the invention. In this sixth step, once the cell 1 is filled with electrolyte 4, a cap 22 of insulating material, sealed and chemically stable with regards to the electrolyte 4 is injected into the holes or holes 21 of the terminal that were used for the filling.

Figure 21H:
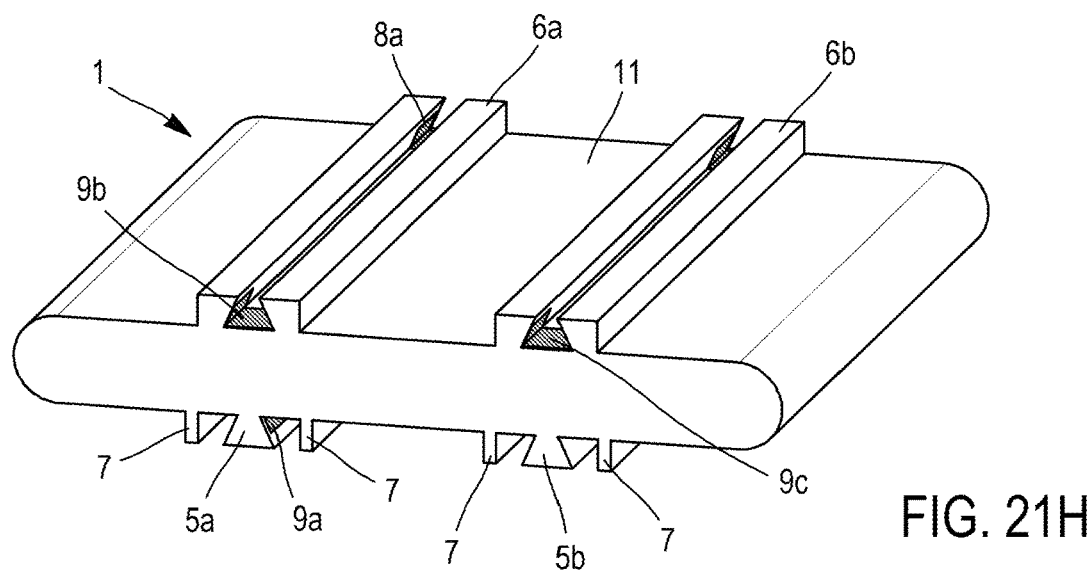

FIG. 21H finally shows the seventh step of the second alternative of the method according to the invention, wherein the final packaging 11 is injected as described above.

FIGS. 22A to 22F show, in perspective, different successive steps of implementing a third alternative of the method in accordance with the invention.

This third alternative of the method according to the invention is similar to the second alternative but does not make use of powder metallurgy (PIM). A tab 23a, 23b is used, for example made of aluminium or of copper, per bank 12, whereon are fixed the male 2c, 3c or female 2a, 3a, 3b element or elements of the positive 3 and negative 2 electrodes. The tab 23a, 23b can also be deformed to the shape of the terminals, i.e. of the male or female elements. Each one of the tabs 23a, 23b is then fixed around the corresponding bank 12 by deformation and/or brazing in order to increase the passage of the current.

Figure 22A:
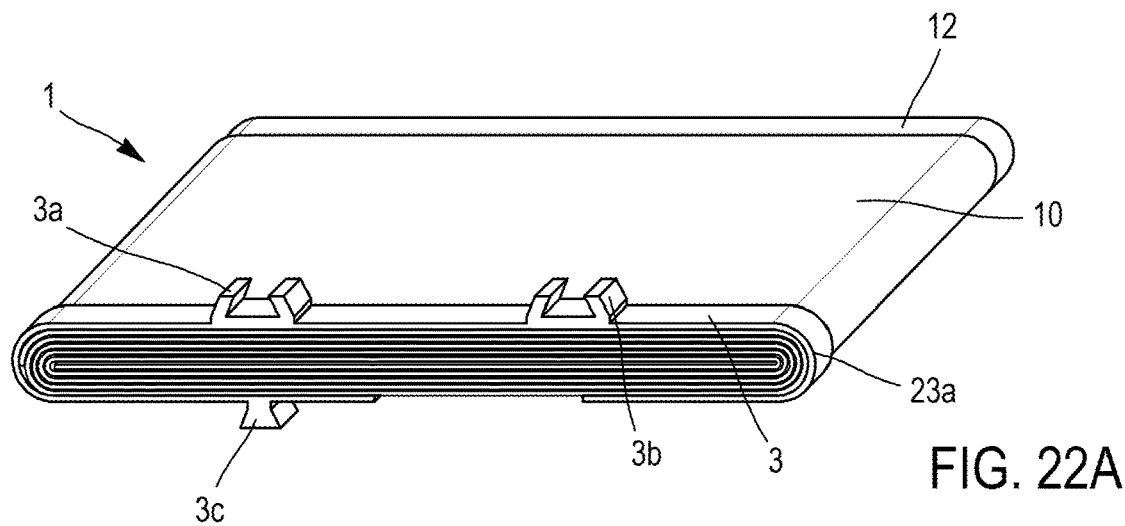
FIGS. 22A to 22F show, in perspective, different successive steps of implementing a third alternative to the method of manufacture in accordance with the invention.
Figure 22B:
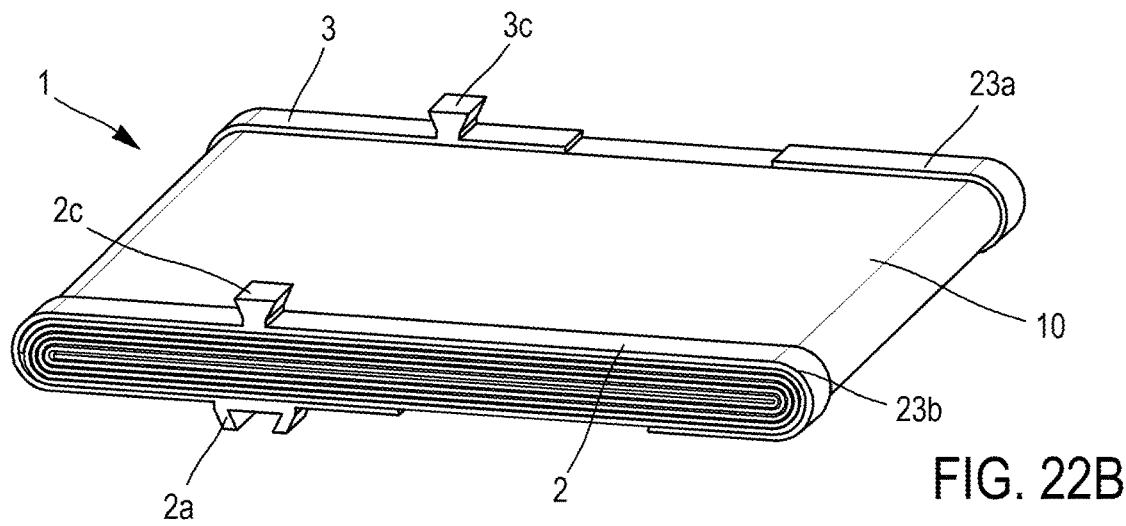

FIGS. 21A and 22B successively show the setting in place of the tab 23a in order to form the positive electrode 3, then the setting in place of the tab 23b in order to form the negative electrode 2 (first and second steps of the third alternative).

Figure 22C:
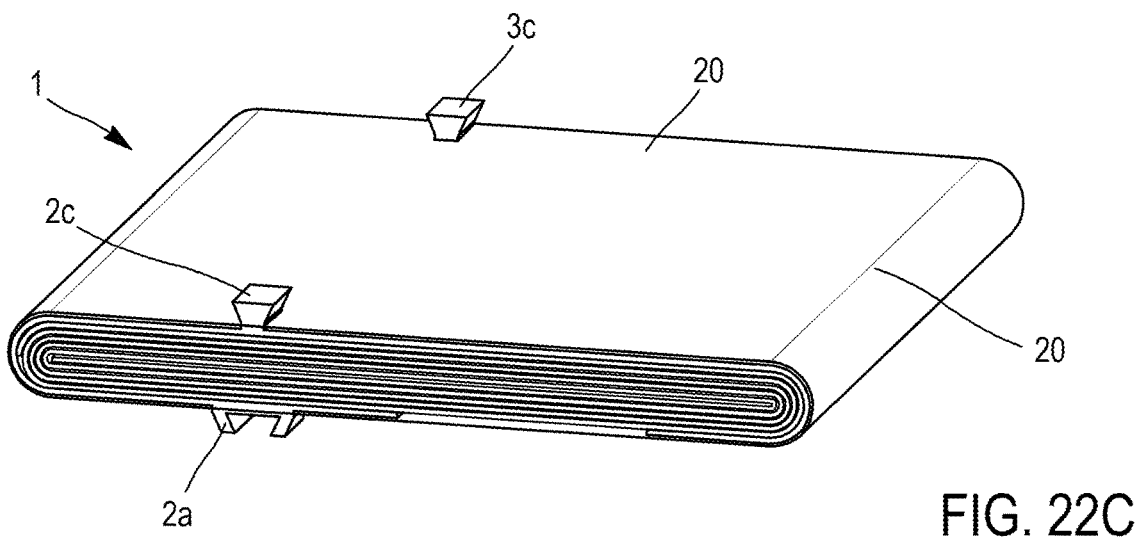

Moreover, FIG. 22C shows the third step of the third alternative of the method according to the invention. In this third step, the electrochemical core 10 is placed in the mould then the film is injected with insulating material 20, sealed and chemically stable with regards to the electrolyte 4. In this third alternative, the film made of insulating material 20 is overmoulded over the entire surface of the electrochemical core 10, except on one end left free of a bank 12 in order to allow for the filling with electrolyte 4.

Figure 22D:
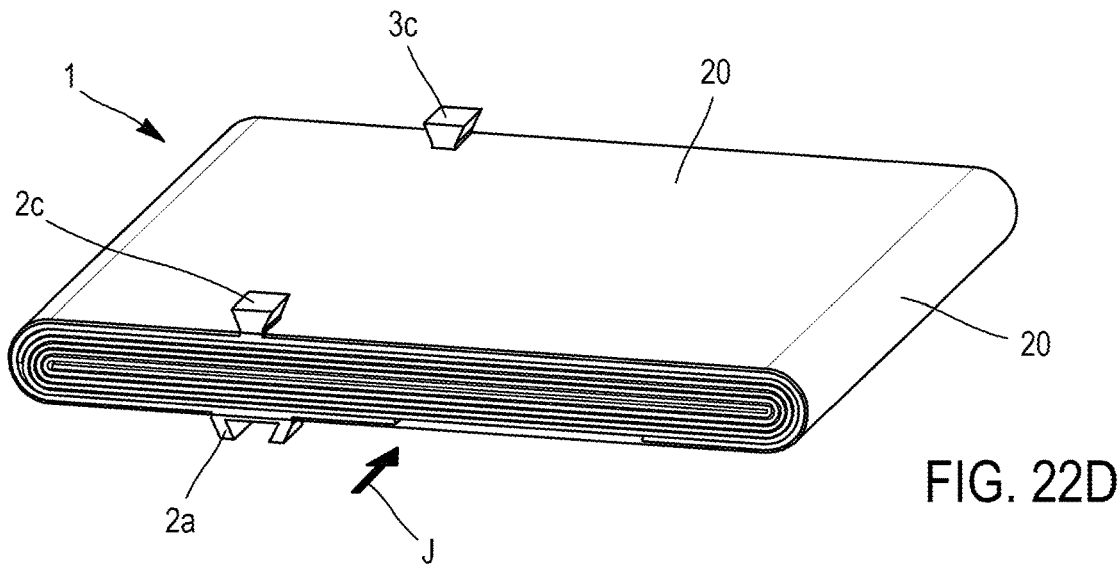

FIG. 22D shows the fourth step of the third alternative of the method according to the invention. In this fourth step, the cell 1 is filled with electrolyte 4 with the quantity required for the proper operation thereof, diagrammed by the arrow J, in the same way as for the two first and second alternatives described hereinabove.

Figure 22E:
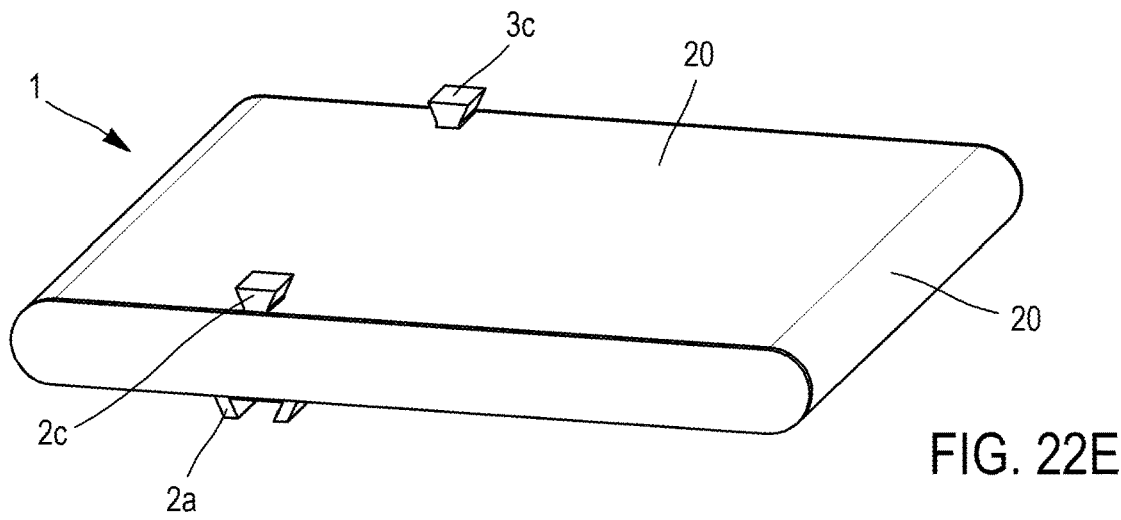

FIG. 22E shows moreover the fifth step of the third alternative of the method according to the invention, wherein a second injection is carried out of the insulating material 20 at the end of the bank 12 left free for the filling with electrolyte 4 and of the terminal thereof in order to seal the electrolyte 4 inside the electrochemical core 10. In this fifth step, it is ensured that the connection zones of the terminals are left free (male and female elements) in order to be able to form the positive 8a and negative 9a, 9b electrical connection interfaces.

Figure 22F:
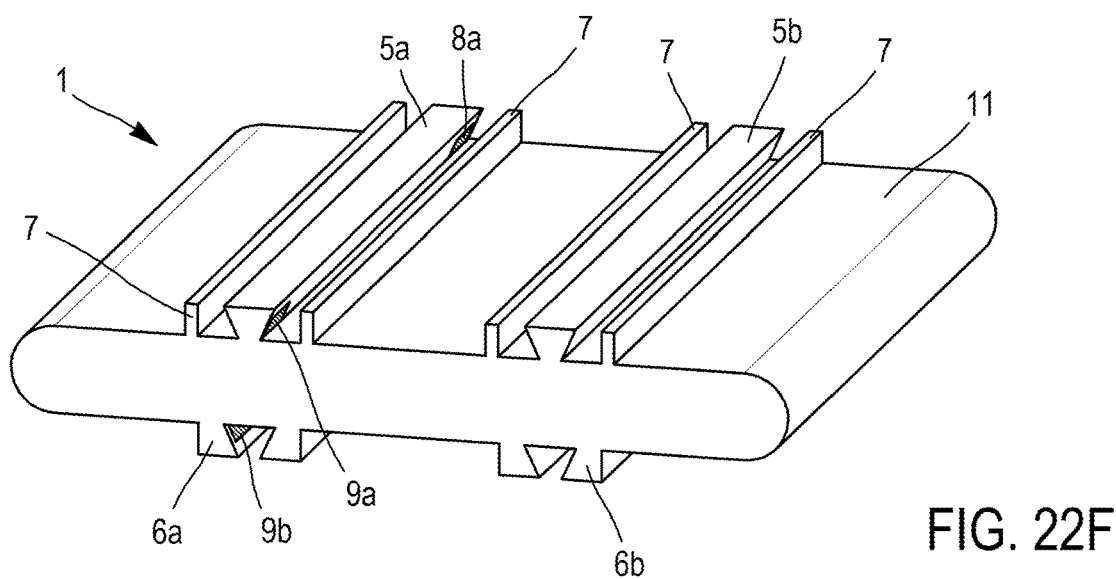

FIG. 22F finally shows the last step of the third alternative of the method according to the invention, wherein the final packaging 11 is inject on the cell 1 with the desired shape, as described above, in order to form the male 5a, 5b and female elements 6a, 6b.

Of course, the invention is not limited to the embodiments that have just been described. Various modifications can be made by those skilled in the art.

The expression "comprising a" must be understood as being synonymous with "comprising at least one", unless the contrary is mentioned.

The invention claimed is:

1. A cell for storing power, configured to be integrated into an electrical module for assembling a power storage system, opposite the first surface, comprising:
- a non-conductive outer casing having a first surface and a second surface;
- on one of the first and second surfaces, at least one male element, and on the other of the first and second surfaces, at least one female element, said at least one male element and at least one female element having shapes that allow for their fitting into one another in such a way that the cell is configured to be assembled to another cell of the same type, said at least one male element or said at least one female element of the cell being configured to respectively fit with at least one female element or at least one male element of the other cell of the same type,
- wherein at least one male element of said at least one male element and at least one female element comprises at least one electrical connection interface having positive polarity and wherein at least one female element of said at least one male element and at least one female element comprises at least one electrical connection interface having negative polarity, or inversely, in such a way that the cell is configured to be electrically connected to the other cell of the same type,
- said male element has a first outer layer projected from the one of the first and second surfaces and formed of a non-conductive material and first side layers connecting the outer surface to the one of the first and second surfaces each formed the non-conductive material, and
- said at least one electrical connection interface of said male element being exposed only in a region of said male element beneath the first outer layer and between the first side layers, and
- an electrical core comprising a negative electrode, a positive electrode and an electrolyte located between the negative electrode and the positive electrode, covered by a packaging configured in such a way as to not cover said at least one electrical connection interface having positive polarity and an electrical connection interface having negative polarity.

2. The cell according to claim 1, wherein the cell is an elementary electrochemical cell.

3. The cell according to claim 1, wherein said at least one electrical connection interface having positive polarity and said at least one electrical connection interface having negative polarity are respectively formed on a first portion of said at least one male element and on a second portion of said at least one female element, or inversely, the first portion of said at least one male element is configured to be covered by at least one female element of another cell of the same type during the assembly by fitting of the cell with the other cell of the same type, and the second portion of said at least one female element is configured to be covered by at least one male element of another cell of the same type during the assembly by fitting of the cell with the other cell of the same type.

4. The cell according to claim 1, wherein said at least one male element extends across an edge of said one of the first and second surfaces of the cell, and wherein said at least one female element extends across an edge of said other of the first and second surfaces of the cell.

5. The cell according to claim 1, wherein said at least one male element has a shape of a groove in relief and wherein said at least one female element has a shape of a hollow groove, with the shapes of grooves in relief and with hollows being complementary with one another in order to allow for the assembly of the cell with another cell of the same type.

6. A cell for storing power, configured to be integrated into an electrical module for assembling a power storage system, comprising:
- an outer casing having a first surface and a second surface opposite to the first surface;
- on one of the first and second surfaces, at least one male element, and on the other of the first and second surfaces, at least one female element, said at least one male element and at least one female element having shapes that allow for their fitting into one another in such a way that the cell is configured to be assembled to another cell of the same type, said at least one male element or said at least one female element of the cell being configured to respectively fit with at least one female element or at least one male element of the other cell of the same type,
- wherein at least one male element of said at least one male element and at least one female element comprises at least one electrical connection interface having positive polarity and wherein at least one female element of said at least one male element and at least one female element comprises at least one electrical connection interface having negative polarity, or inversely, in such a way that the cell is configured to be electrically connected to the other cell of the same type, and
- an electrical core comprising a negative electrode, a positive electrode and an electrolyte located between the negative electrode and the positive electrode, covered by a packaging configured in such a way as to not cover said at least one electrical connection interface having positive polarity and an electrical connection interface having negative polarity,
- wherein said at least one male element has a shape of a groove in relief and wherein said at least one female element has a shape of a hollow groove, with the shapes of grooves in relief and with hollows being complementary with one another in order to allow for the assembly of the cell with another cell of the same type, and
- wherein said one of the first and second surfaces of the cell comprises at least one lug on either side of said at least one male element, in order to allow for the assembly and the safety connection of said at least one male element with at least one female element of another cell of the same type.

7. The cell according to claim 1, wherein said at least one male element and said at least one female element have similar shapes, with the assembly of the cell with another cell of the same type being made possible by an opposite orientation of said at least one male element and of said at least one female element of the cell respectively with respect to at least one female element and at least one male element of the other cell of the same type, during the fitting.

8. The cell according to claim 1, wherein said at least one electrical connection interface having positive polarity extends partially over said at least one male element, in an edge region of said one of first and second surfaces of the cell, and wherein said at least one electrical connection interface having negative polarity extends partially over said at least one female element, in an edge region of said other of the first and second surfaces of the cell, or inversely.

9. The cell according to claim 1, wherein said at least one male element extends longitudinally on said one of first and second surfaces of the cell, and wherein said at least one female element extends longitudinally over said other of the first and second surfaces of the cell.

10. The cell according to claim 1, wherein said at least one male element extends transversally over said one of first and second surfaces of the cell, and wherein said at least one female element extends transversally over said other of the first and second surfaces of the cell.

11. The cell according to claim 1, wherein said at least one male element and/or said at least one female element are, at least partially, formed by the packaging.

12. The cell according to claim 1, wherein the electrical core comprises a negative electrode and a positive electrode, and wherein at least one of the negative electrode and of the positive electrode comprises at least one male electrode element and/or at least one female electrode element of a shape respectively similar to that of said at least one male element of the cell and/or of said at least one female element of the cell, and in that the packaging covers said at least one male electrode element and/or said at least one female electrode element, by having a shape that hugs that of said at least one male electrode element and/or that of said at least one female electrode element, in such a way as to respectively form said at least one male element of the cell and/or said at least one female element of the cell.

13. The cell according to claim 1, wherein said one of the first and second surfaces of the cell comprises at least one male element and at least one female element, and wherein said other of the first and second surfaces of the cell comprises also at least one male element and at least one female element.

14. The cell according to claim 1, comprising means for maintaining in position the cell with another cell of the same type.

15. The cell according to claim 14, wherein the means for maintaining in position comprises orifices formed in said at least one male element and at least one female element, with the orifices of said at least one male element and the orifices of said at least one female element of the cell being respectively configured to be orifices of at least one female element and orifices of at least one male element of another cell of the same type, during the assembly of the cell with at least one other cell of the same type, and wherein the means for maintaining in position further comprise at least one rod for maintaining in position able to be inserted into the orifices of said at least one male element and at least one female element of the cell.

16. A for storing power, configured to be integrated into an electrical module for assembling a power storage system, comprising:
an outer casing having a first surface and a second surface opposite to the first surface;
on one of the first and second surfaces, at least one male element, and on the other of the first and second surfaces, at least one female element, said at least one male element and at least one female element having shapes that allow for their fitting into one another in such a way that the cell is configured to be assembled to another cell of the same type, said at least one male element or said at least one female element of the cell being configured to respectively fit with at least one female element or at least one male element of the other cell of the same type,
wherein at least one male element of said at least one male element and at least one female element comprises at least one electrical connection interface having positive polarity and wherein at least one female element of said at least one male element and at least one female element comprises at least one electrical connection interface having negative polarity, or inversely, in such a way that the cell is configured to be electrically connected to the other cell of the same type,
an electrical core comprising a negative electrode, a positive electrode and an electrolyte located between the negative electrode and the positive electrode, covered by a packaging configured in such a way as to not cover said at least one electrical connection interface having positive polarity and an electrical connection interface having negative polarity, and
means for maintaining in position the cell with another cell of the same type,
wherein the means for maintaining in position comprises at least one groove for maintaining in position the packaging of the cell configured in such a way as to be superposed upon at least one groove for maintaining in position of another cell of the same type, during the assembly of the cell with at least one other cell of the same type, and wherein the means for maintaining in position further comprise a part for maintaining in position configured to be inserted into said at least one groove for maintaining in position of the cell and of the cell of the same type during the assembly of the cells.

17. The cell according to claim 1, wherein the cell comprises, on said one of its first and second surfaces, at least two male elements extending substantially parallel from one edge to the other of said one of first and second surfaces of the cell, and on said other of its first and second surfaces, at least two female elements extending substantially parallel from one edge to the other of said other of the first and second surfaces of the cell.

18. The cell according to claim 17, wherein said at least two male elements are respectively superposed upon said at least two female elements.

19. The cell according to claim 17, wherein the electrical core is an electrochemical core, wherein one of the positive electrode and of the negative electrode comprises a male electrode element extending to said one of first and second surfaces of the cell and a female electrode element extending to said other of the first and second surfaces of the cell, the male electrode element and the female electrode element being superposed each upon the other, and wherein the other of the positive electrode and of the negative electrode comprises a male electrode element extending to said one of first and second surfaces of the cell and two female electrode elements extending to said other of the first and second surfaces of the cell or two male electrode elements extending to said one of first and second surfaces of the cell and a female electrode element extending to said other of the first and second surfaces of the cell, a male electrode element and a female electrode element being superposed each upon the other.

20. The cell according to claim 19, wherein the electrochemical core is covered by the packaging configured in such a way as to not cover the electrical connection interfaces having positive polarity and the electrical connection interfaces having negative polarity of the male and female elements of the cell, with the packaging defining said male and female elements of the cell and hugging the shapes of the male electrode elements and of the female electrode elements.

21. The cell according to claim 20, wherein the cell has, on one of its first and second surfaces, an electrical connection interface having negative polarity and an electrical connection interface having positive polarity and, on the other of its first and second surfaces, an electrical connection interface having positive polarity and two electrical connection interfaces having negative polarity, or an electrical connection interface having negative polarity and two electrical connection interfaces having positive polarity.

22. A unit comprising a first cell and a second cell as claimed in claim 1, said at least one male element of the first cell being fitted into said at least one female element of the second cell, or said at least one female element of the first cell being fitted into said at least one male element of the second cell, in order to allow for the assembly and the electrical connection of the first and second cells together.

23. An electrical module for assembling a power storage system, comprising an assembly of several cells according to claim 1.

24. The electrical module according to claim 23, wherein the module is an electrochemical module for assembly comprising an assembly of several elementary electrochemical cells.

25. The electrical module according to claim 23, comprising at least one male module element and at least one female module element, respectively of the same type as said at least one male element and at least one female element of the cells, in order to allow for the assembly and the electrical connection of the cells on the module for assembling.

26. The electrical module according to claim 23, comprising at least one male connecting rod able to be fitted into a plurality of female elements of the cells, and at least one female connecting rod able to be fitted into a plurality of male elements of the cells, in such a way as to allow for the assembly and the electrical connections of the cells together in the module for assembly.

27. A power storage system, comprising an assembly of several modules according to claim 23.

28. The system according to claim 27, comprising at least one male battery element and at least one female battery element, respectively of the same type as said at least one male element and at least one female element of the cells, in order to allow for the assembly and the electrical connection of the cells on the power storage system.

29. The cell according to claim 1, wherein:
the at least one electrical connection interface of said male element being recessed from an outermost edge of said first outer layer and from outmost edges of said first side layers.

30. The cell according to claim 1, wherein
the at least one female element comprises a second outer layer projected from said outer casing and second side layers connecting the second outer layer with the outer casing, and
the one of at least one electrical connection interface of said female element being located entirely inside of the second outer layer and the second side layers.

* * * * *